United States Patent
Matthews et al.

(10) Patent No.: US 9,166,486 B2
(45) Date of Patent: Oct. 20, 2015

(54) POWER CONVERTER USING MULTIPLE CONTROLLERS

(71) Applicant: Power Integrations, Inc., San Jose, CA (US)

(72) Inventors: David Michael Hugh Matthews, Los Gatos, CA (US); Balu Balakrishnan, Saratoga, CA (US); David Kung, Foster City, CA (US)

(73) Assignee: Power Integrations, Inc., San Jose, CA (US)

( * ) Notice: Subject to any disclaimer, the term of this patent is extended or adjusted under 35 U.S.C. 154(b) by 213 days.

(21) Appl. No.: 13/791,459

(22) Filed: Mar. 8, 2013

(65) Prior Publication Data

US 2014/0254212 A1    Sep. 11, 2014

(51) Int. Cl.
  *H02M 3/335* (2006.01)
  *H02M 3/156* (2006.01)
  *H02M 1/32* (2007.01)
  *H02M 1/00* (2007.01)

(52) U.S. Cl.
  CPC ........ *H02M 3/33523* (2013.01); *H02M 3/1563* (2013.01); *H02M 3/335* (2013.01); *H02M 3/33515* (2013.01); *H02M 1/32* (2013.01); *H02M 2001/0025* (2013.01); *H02M 2001/0038* (2013.01); *H02M 2001/327* (2013.01)

(58) Field of Classification Search
  CPC .......................... H02M 3/33507; H02M 3/335
  USPC .......... 363/21.01, 21.02, 21.12, 21.13, 21.07, 363/21.09, 21.1, 21.11, 97, 131
  See application file for complete search history.

(56) References Cited

U.S. PATENT DOCUMENTS

| | | | |
|---|---|---|---|
| 4,791,546 A | 12/1988 | Carroll | |
| 5,162,970 A | 11/1992 | Davis, Jr. et al. | |
| 5,650,357 A | 7/1997 | Dobkin et al. | |
| 6,384,478 B1 | 5/2002 | Pour | |
| 6,998,952 B2 | 2/2006 | Zhou et al. | |
| 7,468,547 B2 | 12/2008 | Harvey | |

(Continued)

FOREIGN PATENT DOCUMENTS

| | | |
|---|---|---|
| EP | 1213822 A1 | 6/2002 |
| JP | H09260569 A | 10/1997 |
| WO | WO 87/04885 A1 | 8/1987 |

OTHER PUBLICATIONS

PCT/US2014/022088—PCT International Search Report and Written Opinion, mailed Aug. 14, 2014 (11 pages).

*Primary Examiner* — Matthew Nguyen
*Assistant Examiner* — Trinh Dang
(74) *Attorney, Agent, or Firm* — Blakely Sokoloff Taylor & Zafman LLP

(57) ABSTRACT

A power converter controller includes a primary controller and a secondary controller. The primary controller is coupled to receive one or more request signals from the secondary controller and transition a power switch from an OFF state to an ON state in response to each of the received request signals. The primary controller is coupled to detect a turn-off condition when the power switch is in the ON state and transition the power switch from the ON state to the OFF state in response to detection of the turn-off condition. The secondary controller is galvanically isolated from the primary controller. The secondary controller is coupled to transmit the request signals to the primary controller and control the amount of time between the transmission of each of the request signals.

28 Claims, 9 Drawing Sheets

(56) References Cited

U.S. PATENT DOCUMENTS

| | | |
|---|---|---|
| 7,524,731 B2 | 4/2009 | Wang |
| 7,619,297 B2 | 11/2009 | Wang |
| 7,868,431 B2 | 1/2011 | Feng et al. |
| 7,884,696 B2 | 2/2011 | Hébert et al. |
| 8,093,983 B2 | 1/2012 | Fouquet et al. |
| 8,772,909 B1 | 7/2014 | Vinciarelli |
| 2004/0120163 A1 | 6/2004 | Nakagawa |
| 2004/0214376 A1 | 10/2004 | Gibson et al. |
| 2005/0271148 A1 | 12/2005 | Dupuis |
| 2011/0242858 A1 | 10/2011 | Strzalkowski |
| 2012/0287682 A1 | 11/2012 | Zhang et al. |
| 2014/0036550 A1* | 2/2014 | Yang et al. ............ 363/21.12 |

* cited by examiner

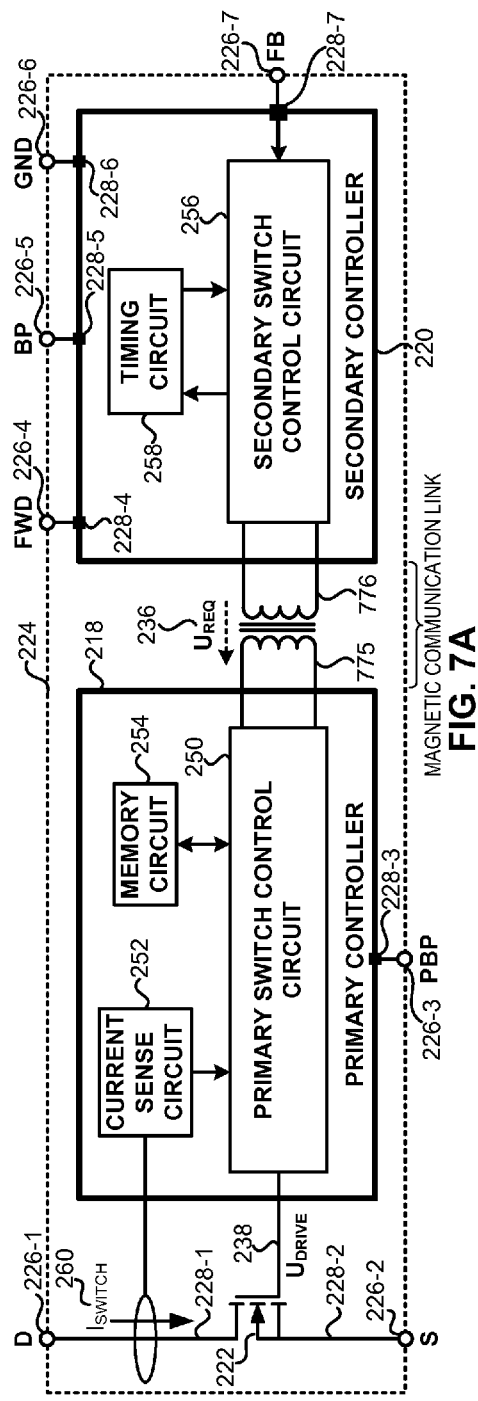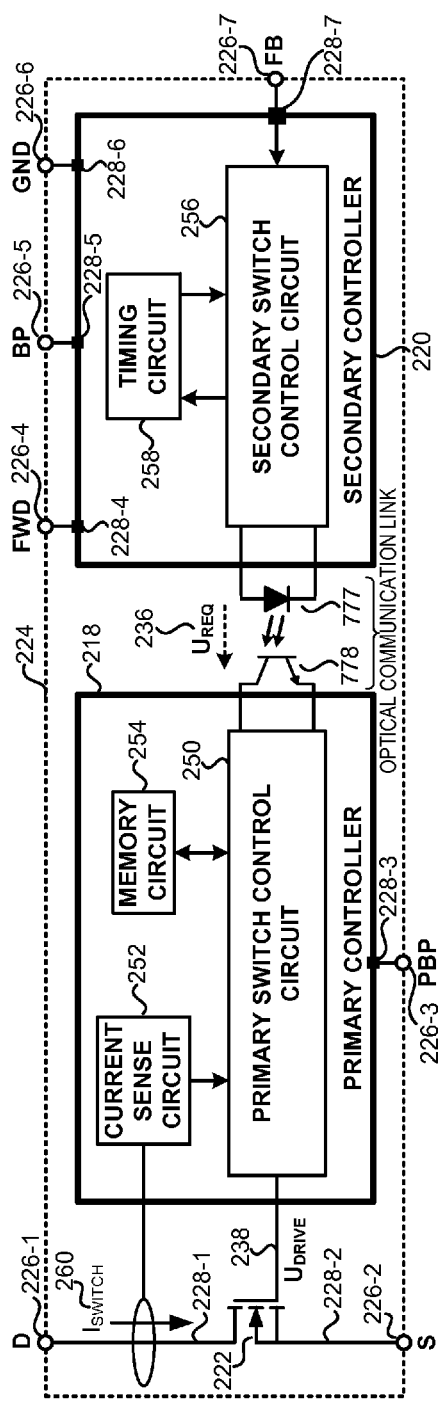

POWER CONVERTER USING MULTIPLE CONTROLLERS

BACKGROUND INFORMATION

1. Field of the Disclosure

This disclosure relates to power supplies and, more particularly, to control circuits for power supplies.

2. Background

Switch mode power supplies are widely used in household or industrial appliances for converting a low frequency (e.g., 50 Hz or 60 Hz) high voltage alternating current (ac) input voltage to a required level of direct current (dc) output voltage. For example, switch mode power supplies may be included in electronic devices such as battery chargers for mobile electronic devices. Various types of switch mode power supplies are popular because of their well-regulated output, high efficiency, and small size along with their safety and protection features. Popular topologies of switch mode power supplies include flyback, forward, boost, buck, half bridge, and full bridge, among many others including resonant types.

Switch mode power supplies may include an energy transfer element, a power switch, and control circuits that operate to regulate the value of the power converter output voltage. The energy transfer element (e.g., a coupled inductor) may include a primary winding and a secondary winding that are galvanically isolated from one another. The primary winding may be coupled to circuits on the input side of the power converter, such as the power switch. The secondary winding may be coupled to circuits on the output side of the power converter that deliver the regulated output voltage to the electrical load.

The power switch (e.g., a high voltage power switch) may be coupled to the primary winding of the energy transfer element to control current through the primary winding. The control circuits of the power converter may sense the output voltage and control the state of the power switch to control the transfer of energy from the primary winding to the secondary winding in response to the sensed output voltage.

BRIEF DESCRIPTION OF THE DRAWINGS

Non-limiting and non-exhaustive embodiments of the present disclosure are described with reference to the following figures, wherein like reference numerals may refer to like parts throughout the various figures.

FIG. 7A is a functional block diagram of an example integrated circuit package that includes a magnetically coupled communication link.

FIG. 7B is a functional block diagram of an example integrated circuit package that includes an optically coupled communication link.

Figure 1:
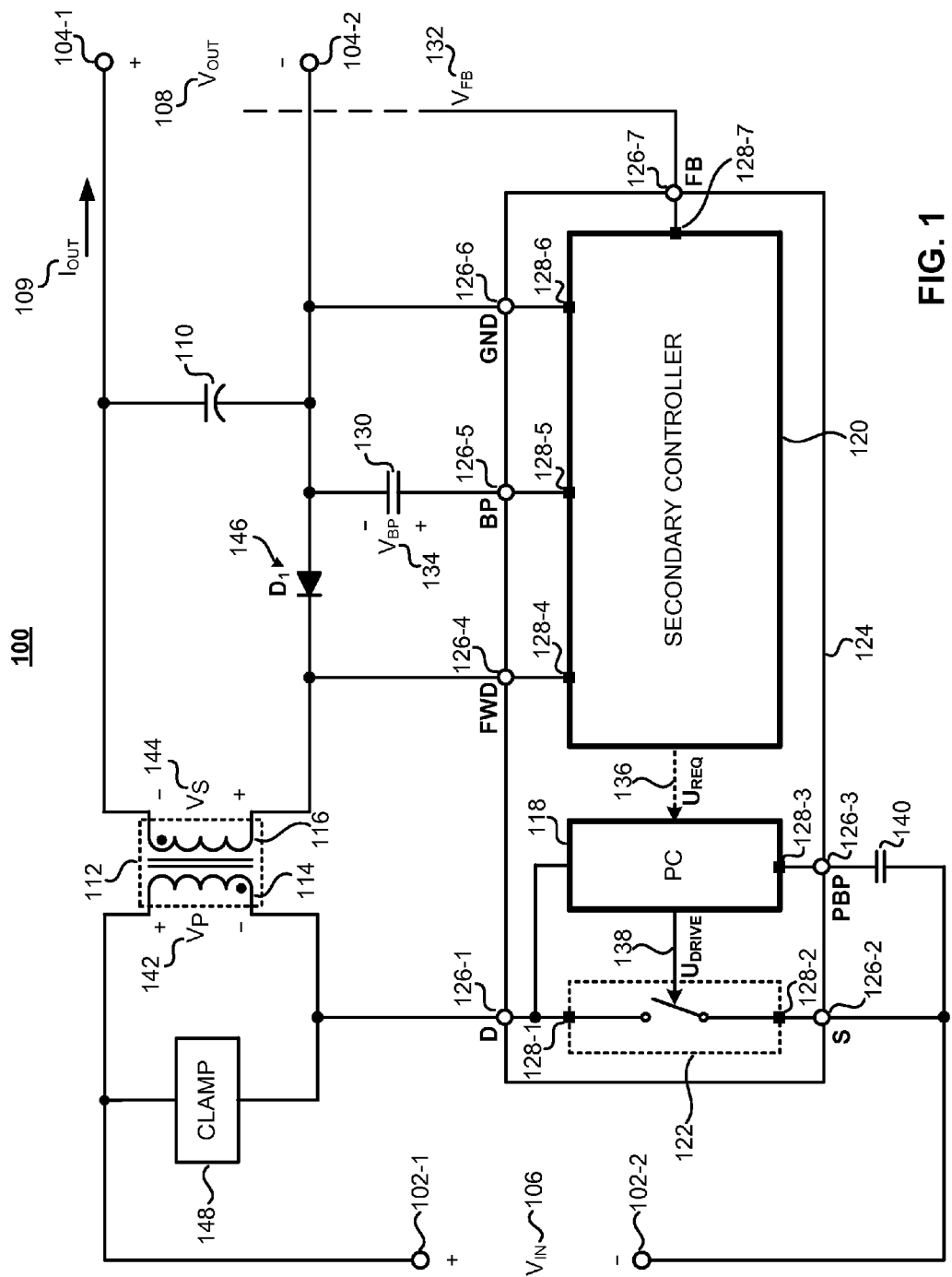
FIG. 1 is a schematic diagram of an example power converter including a primary controller, a secondary controller, and a power switch.

Corresponding reference characters may indicate corresponding components throughout the several views of the drawings. Skilled artisans will appreciate that elements in the figures are illustrated for simplicity and clarity and have not necessarily been drawn to scale. Common but well-understood elements that are useful or necessary in commercially feasible embodiments are often not depicted in order to facilitate understanding of the various embodiments.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures, or characteristics may be combined in any suitable combinations and/or subcombinations in one or more embodiments or examples. Particular features, structures, or characteristics may be included in an integrated circuit, an electronic circuit, a combinational logic circuit, or other suitable components that provide the described functionality.

A power converter according to the present disclosure includes a primary controller and a secondary controller that are galvanically isolated from one another, e.g., by a communication link. The primary controller may be coupled to control a state of a power switch to control the transfer of energy from an input of the power converter to an output of the power converter. The secondary controller may be coupled to circuit components at the output of the power converter in order to sense an output quantity of the power converter. Although the primary controller and the secondary controller are galvanically isolated from one another, the secondary controller may transmit signals to the primary controller to control how the primary controller switches the power switch. For example, the secondary controller may transmit signals to the primary controller in response to a sensed output quantity of the power converter.

In some examples, the primary and secondary controllers of the present disclosure may be included in an isolated power converter (e.g., a flyback converter) in which the input terminals of the isolated power converter are galvanically isolated from the output terminals of the isolated power converter by an energy transfer element (e.g., a coupled inductor). In these examples, the primary controller may be coupled to circuits on the primary side of the isolated power converter, such as a power switch. The secondary controller may be coupled to circuits on the secondary side of the isolated power converter to sense an output quantity of the isolated power converter.

In some examples, the primary and secondary controllers of the present disclosure may be included in a non-isolated power converter (e.g., a non-isolated buck converter) in which the input terminals of the non-isolated power converter are not galvanically isolated from the output terminals. When used in a non-isolated power converter, the primary and secondary controllers may be galvanically isolated from one another (e.g., by a communication link) although the input terminals and output terminals of the non-isolated power converter are not galvanically isolated from one another.

The primary and secondary controllers may operate to regulate an output quantity (e.g., voltage and/or current) of the power converter that is delivered to a load. For example, the primary and secondary controllers may operate to regulate the output voltage of the power converter to a desired output voltage value in response to a sensed output voltage. Although the primary and secondary controllers may regulate the output voltage in response to a sensed output voltage, in some examples, the primary and secondary controllers may regulate the output voltage and/or the output current of the power converter in response to a sensed output voltage and/or a sensed output current.

The secondary controller is coupled to transmit an energy request signal (hereinafter "request signal") to the primary controller. The primary controller is coupled to set the power switch into an ON state (e.g., a closed switch) when the primary controller receives the request signal. Accordingly, the secondary controller of the present disclosure may control when the power switch is set into the ON state. After the primary controller sets the power switch into the ON state, the primary controller determines when to set the power switch into the OFF state (e.g., an open circuit). Accordingly, the primary controller may control when the power switch is turned OFF. In other words, the primary controller may control how long the power switch remains in the ON state. As described hereinafter, the secondary controller may include a timing circuit that controls how often the power switch may be set into the ON state by the primary controller. Put another way, the secondary controller may control the rate (e.g., the max rate) at which the power switch is set into the ON state.

Figure 2:
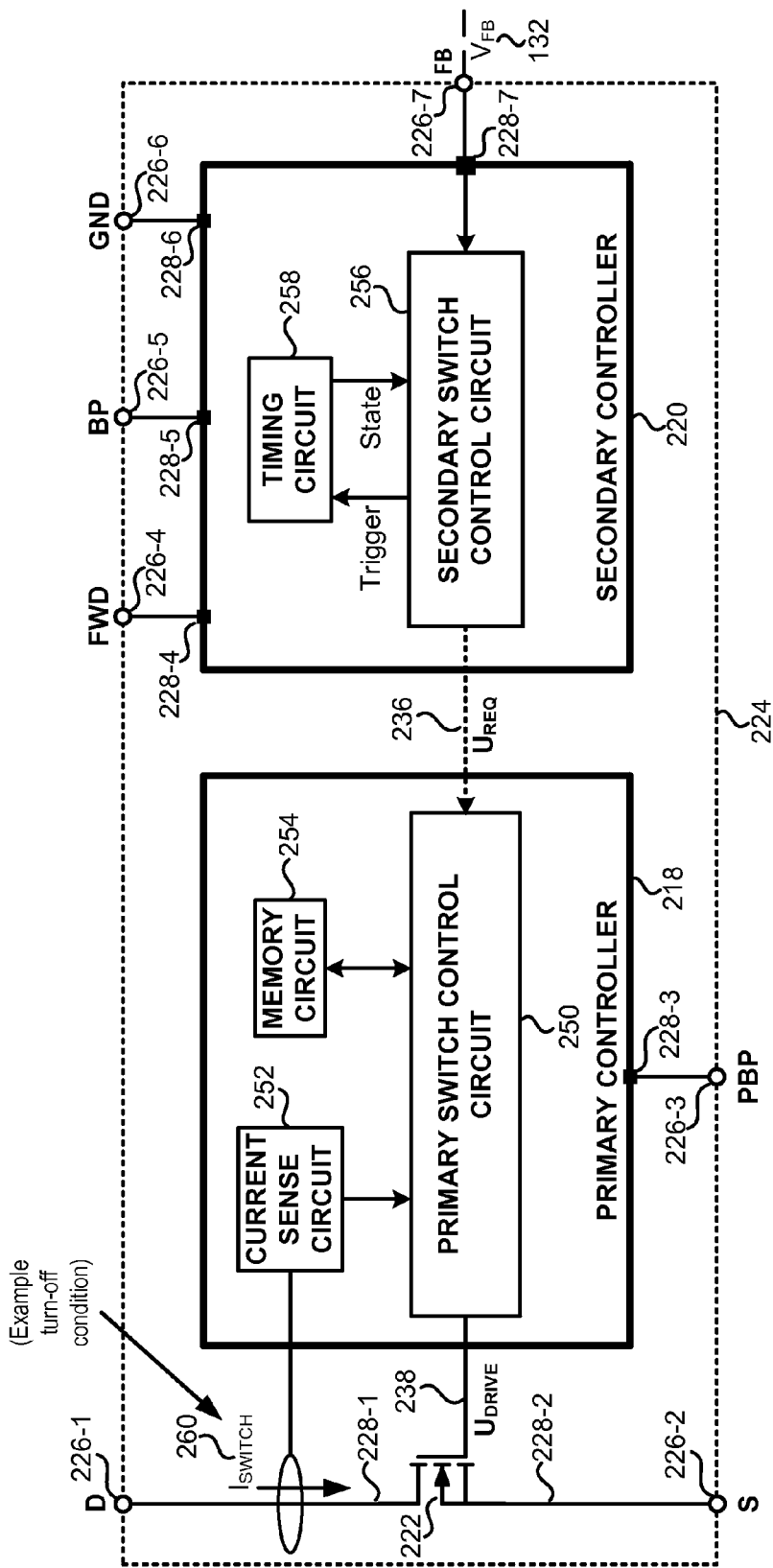
FIG. 2 is a functional block diagram of an example integrated circuit package that includes a primary controller, a secondary controller, and a power switch.

The primary controller may include circuits that set the state of the power switch (e.g., a primary switch control circuit 250 of FIG. 2). In general, the primary controller may maintain the power switch in an OFF state until a request signal is received from the secondary controller. In response to the request signal, the primary controller may set the power switch into an ON state. After setting the power switch in the ON state, the primary controller may determine when to set the switch into the OFF state in response to one or more of a variety of different conditions, referred to herein as "turn-off conditions." In some examples, the primary controller may sense the switch current through the power switch and set the power switch into an OFF state when the switch current reaches a threshold current limit while the power switch is in the ON state. In other examples, the primary controller may be coupled to set the power switch into the ON state for a set period of time, referred to herein as a "conduction period." The primary controller may set the power switch into the OFF state after the conduction period has expired. The turn-off conditions (e.g., threshold current limit and/or the conduction period) may be fixed quantities in some examples. In other examples, the primary controller may adjust the turn-off conditions, e.g., in response to loading conditions.

The secondary controller includes circuits that control when request signals are transmitted to the primary controller. For example, the secondary controller may include a timing circuit and a secondary switch control circuit (e.g., the secondary switch control circuit 256 of FIG. 2) that control how often request signals are sent to the primary controller, which in turn controls how often the power switch is set into an ON state. The secondary switch control circuit may generate a request signal in response to a sensed output quantity of the power converter (e.g., output voltage) and a state of the timing circuit, as described hereinafter.

The timing circuit may operate in one of a first state and a second state. In general, the timing circuit may operate in a first state until the timing circuit is triggered by the secondary switch control circuit to operate in the second state. As described herein, when the timing circuit is in the second state, the secondary switch control circuit may be prevented from transmitting a request signal. When triggered by the secondary switch control circuit, the timing circuit may transition from the first state to the second state and remain in the second state for a period of time, referred to herein as a "holding period." After the timing circuit has been in the second state for a holding period, the timing circuit may transition back to the first state. The timing circuit may stay in the first state until triggered by the secondary switch control circuit, as described above.

The secondary switch control circuit is coupled to sense the output voltage of the power converter and determine whether the output voltage is less than a desired output voltage. The secondary switch control circuit may transmit a request signal to the primary controller and trigger the timing circuit when the sensed output voltage is less than a desired output voltage and the timing circuit is in the first state. For example, the secondary switch control circuit may transmit a request signal to the primary controller and also generate a trigger signal that triggers the timing circuit. Since the primary controller sets the power switch into the ON state in response to the request signal, the timing circuit may transition to the second state at approximately the same time as the power switch is set into the ON state.

As described above, the secondary switch control circuit may transmit a request signal when the secondary switch control circuit determines that the output voltage is less than the desired output voltage and determines that the timing circuit is in the first state. In other circumstances, such as when the timing circuit is in the second state or the output voltage is greater than the desired output voltage, the secondary switch control circuit may withhold transmission of the request signal. In other words, the secondary switch control circuit may decide not to transmit the request signal when the timing circuit is in the second state and/or the output voltage is greater than the desired output voltage.

In one example, when the output voltage of the power converter is greater than the desired output voltage and the timing circuit is in the first state, the secondary switch control circuit may withhold transmission of the request signal until the output voltage drops to a value that is less than the desired output voltage. In this example, the secondary switch control circuit may transmit the request signal and trigger the timing circuit when the output voltage drops to less than the desired output voltage. In another example, when the output voltage is less than the desired output voltage and the timing circuit is in the second state, the secondary switch control circuit may withhold transmission of the request signal until the timing circuit transitions to the first state. In this example, the secondary switch control circuit may transmit the request signal and trigger the timing circuit back to the second state in response to the timing circuit entering the first state, assuming that the output voltage is still at a level that is less than the desired output voltage when the timing circuit transitions to the first state.

The secondary switch control circuit may control the rate at which request signals are transmitted to the primary controller. Accordingly, the secondary switch control circuit may control the rate at which the power switch is set to the ON state since the primary controller may set the power switch in the ON state in response to each request signal. The secondary switch control circuit may control the rate at which request signals are sent in response to an amount of loading at the output of the power converter. For example, the secondary switch control circuit may tend to transmit request signals at a greater rate during heavier loading when the output voltage of the power converter may tend to drop below the desired output voltage faster than during lighter loading at the output. In examples where the loading at the output decreases, the secondary switch control circuit may tend to transmit request signals at a lower rate than when heavier loading is present at the output.

The holding period of the timing circuit may set a maximum rate at which request signals may be transmitted since the secondary switch control circuit withholds transmission of a request signal while the timing circuit is in the second state. Accordingly, the holding period of the timing circuit may set a maximum rate at which the power switch may be set into the ON state. Put another way, the holding period may be approximately equal to the minimum time between two consecutive request signals, or two consecutive transitions of the power switch into the ON state. For example, during heavy loading, the secondary switch control circuit may transmit request signals that are separated by approximately one holding period of the timing circuit.

The holding period may be set to a value that allows a sufficient amount of time for energy to be transferred to the output side of the power converter. In examples where the power converter is an isolated power converter, the holding period may be set to a value that allows for energy transfer to the secondary side after the primary controller has switched the power switch from the ON state to the OFF state. Since the primary controller determines how long the power switch remains in the ON state, the holding period of the timing circuit and the turn-off conditions of the power switch may be selected such that a sufficient amount of energy is transferred after the power switch is set to the OFF state.

The primary controller may adjust the turn-off conditions (e.g., threshold current limit and/or the conduction period) in response to loading conditions at the output of the power converter. For example, the primary controller may adjust the turn-off conditions based on the rate at which the primary controller receives request signals. As described above, the primary controller may tend to receive request signals at a greater rate during times when the output is more heavily loaded. In some examples, the primary controller may determine loading conditions based on how many request signals the primary controller receives over a period of time. In other examples, the primary controller may determine loading conditions based on the amount of time between two consecutive request signals.

In general, the primary controller may adjust the turn-off conditions so that the power switch is kept in the ON state for a longer period of time when loading is heavier at the output. For example, the primary controller may increase the threshold current limit and/or the conduction period of the power switch during heavier loading so that the power switch is held in the ON state for a greater amount of time. Holding the power switch in the ON state for a greater amount of time may result in a greater amount of energy transfer to the output of the power converter so that the output voltage of the power converter is maintained at the desired output voltage during heavier loading.

Figure 3:
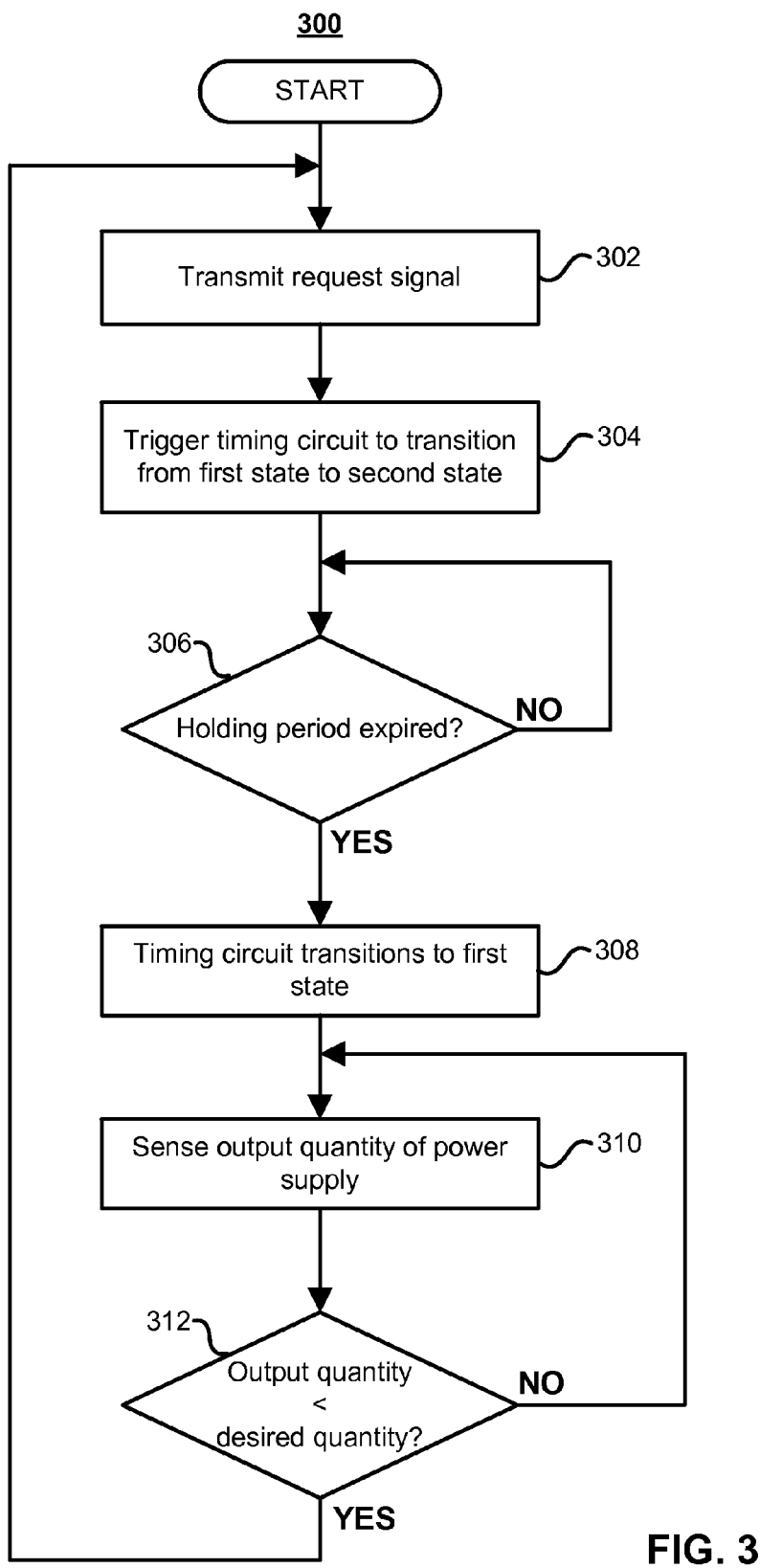
FIG. 3 is a flow diagram describing operation of an example secondary controller of a power converter.
Figure 4:
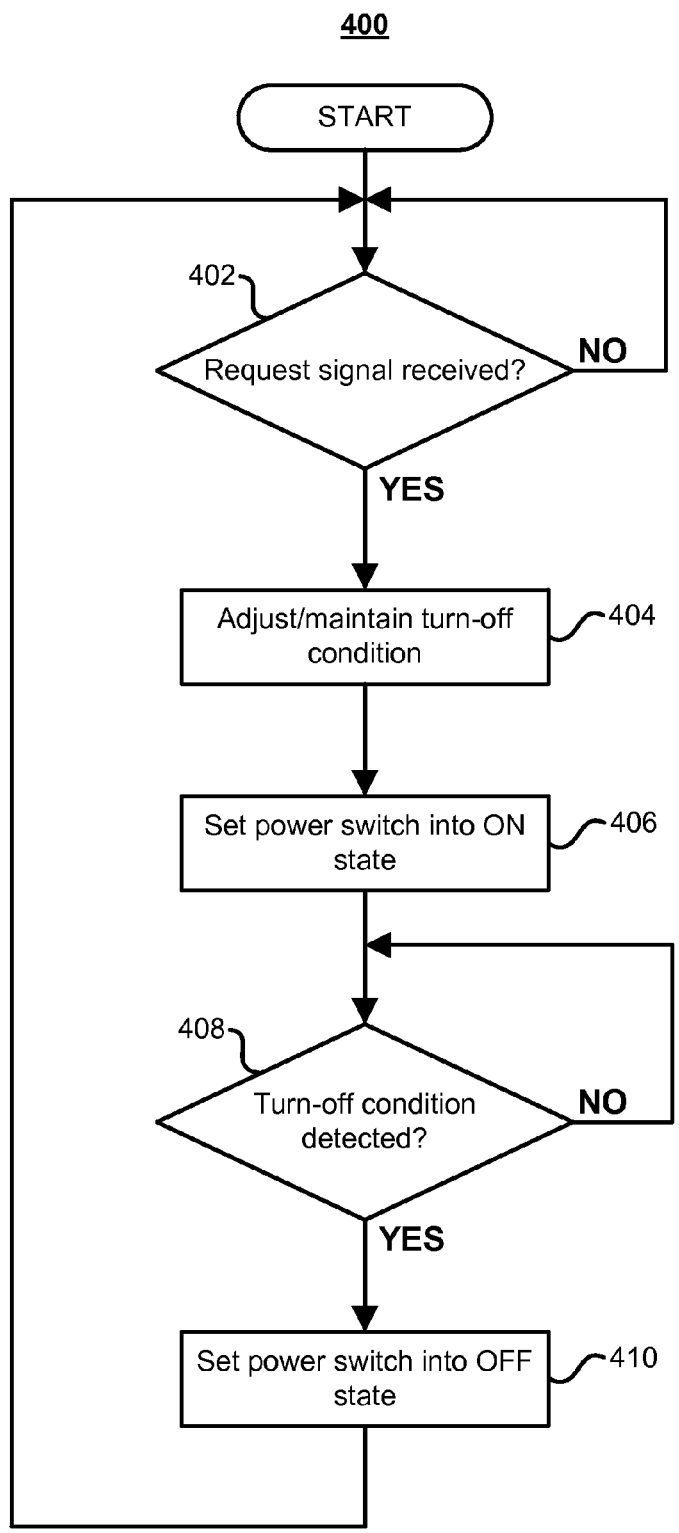
FIG. 4 is a flow diagram describing operation of an example primary controller of a power converter.
Figure 5:
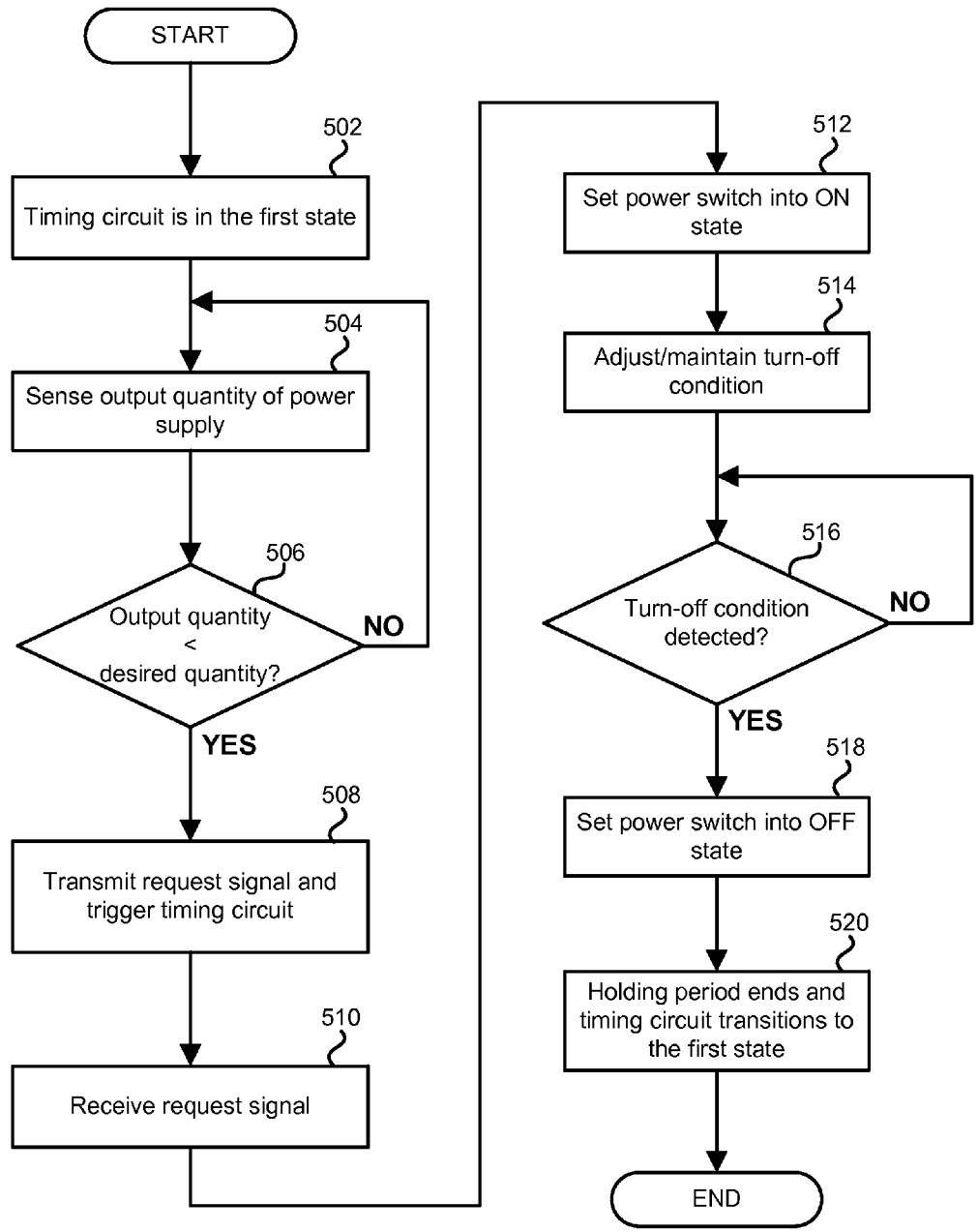
FIG. 5 is a flow diagram describing operation of an example primary controller and an example secondary controller of a power converter.
Figure 6:
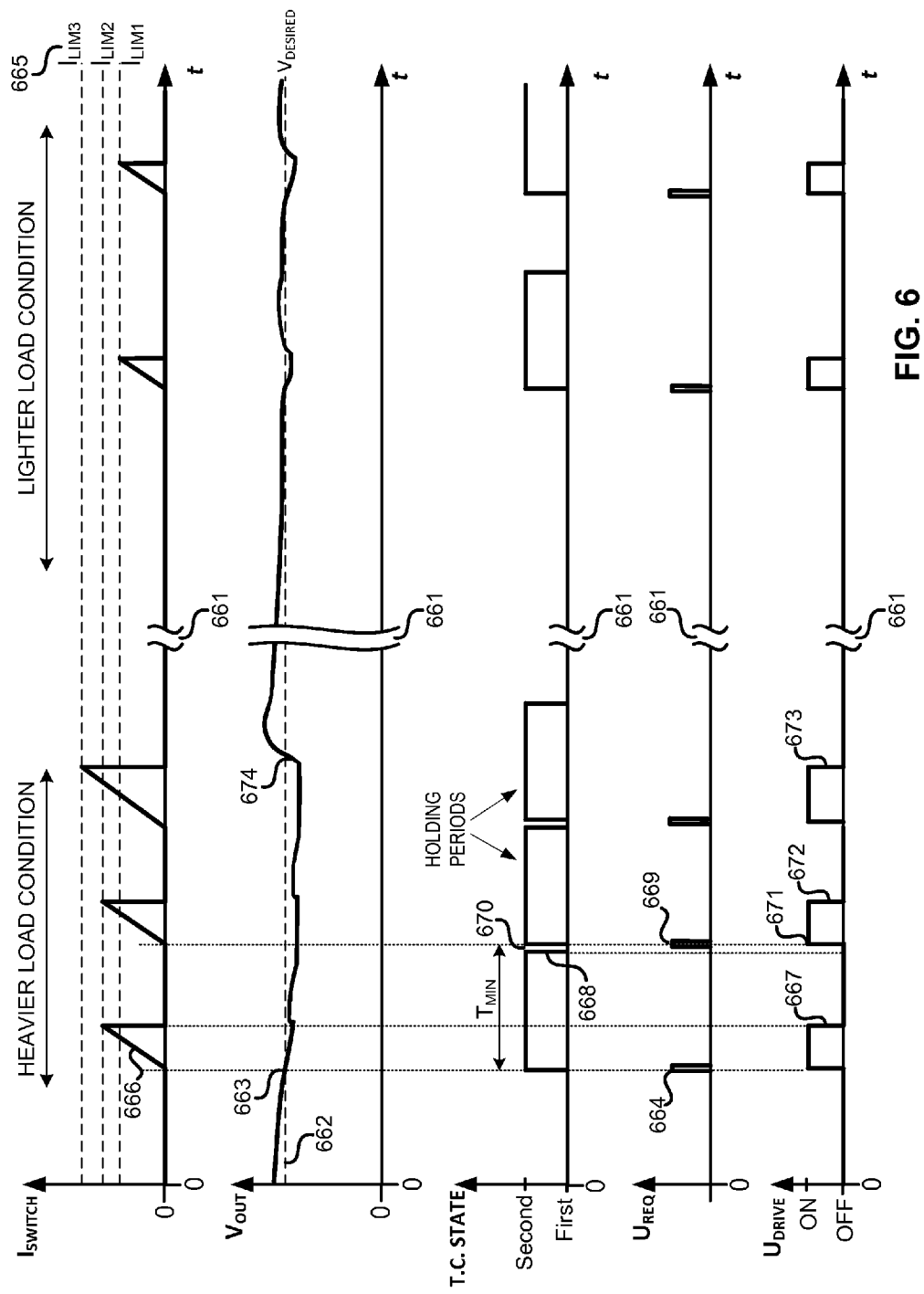
FIG. 6 illustrates various waveforms generated during operation of an example primary controller and an example secondary controller.
Figure 8:
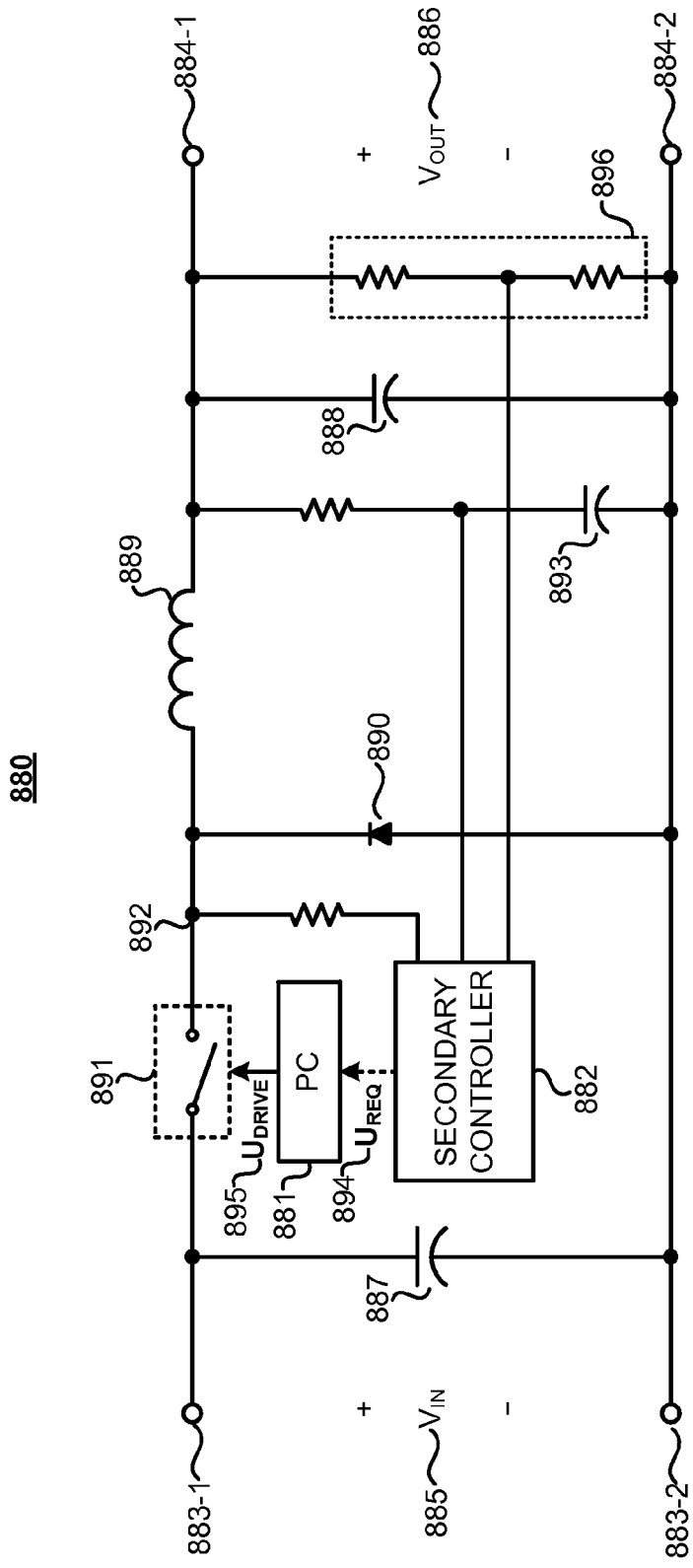
FIG. 8 is a schematic diagram of an example non-isolated power converter that includes an example primary controller and an example secondary controller.
Figure 9:
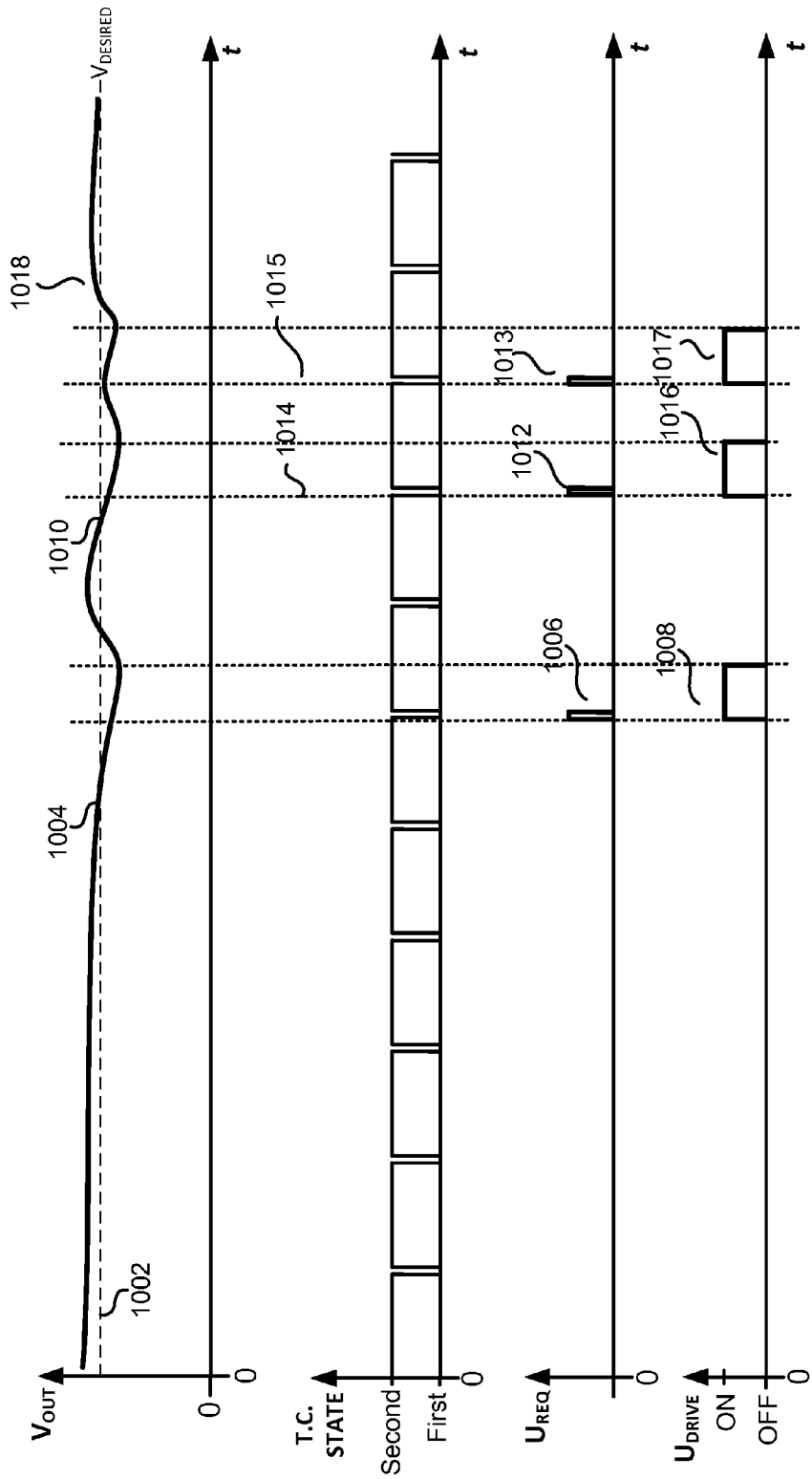
FIG. 9 illustrates various alternate waveforms generated during operation of an example primary controller and an example alternative secondary controller.

Example power supplies according to the present disclosure are now described with reference to FIGS. 1-10. FIG. 1 shows an example isolated power converter that includes a primary controller and a secondary controller that operate to regulate an output quantity of the isolated power converter to a desired output quantity. FIG. 2 illustrates a more detailed view of example primary and secondary controllers. FIGS. 3-5 are flow diagrams that illustrate operation of example primary and secondary controllers. FIG. 6 illustrates various waveforms generated during operation of the primary and secondary controllers. FIGS. 7A-7B show example communication links through which the secondary controller may send a request signal to the primary controller. FIG. 8 shows a non-isolated power converter that includes example primary and secondary controllers. FIGS. 9-10 describe operation of an alternative secondary controller.

FIG. 1 is a schematic diagram of an example power converter 100 according to the present disclosure. Example power converter 100 is an isolated switch mode power converter having a flyback topology. Although primary side control circuit 118 and secondary side control circuit 120 of FIG. 1 are included in an isolated power converter, in other examples, primary side control circuit 118 and secondary side control circuit 120 may be included in non-isolated power supplies (e.g., a non-isolated buck converter as shown in FIG. 8).

Power converter 100 includes input terminals 102-1, 102-2 (collectively "input terminals 102") and output terminals 104-1, 104-2 (collectively "output terminals 104"). Input terminals 102 are coupled to receive an input voltage $V_{IN}$ 106, which may be a rectified and filtered ac voltage. For example, input terminals 102 may be coupled to a full-bridge rectifier (not shown) and a filter capacitance (not shown) that are coupled to rectify and filter an ac voltage received from an ac voltage source. In one example, input voltage $V_{IN}$ 106 may be a time-varying dc voltage. As shown, $V_{IN}$ 106 is referenced to input terminal 102-2, which may be referred to as an "input return 102-2."

Output terminals 104 provide an output voltage $V_{OUT}$ 108 to an electrical load (not shown). After startup of power converter 100, power converter 100 may regulate the value of output voltage $V_{OUT}$ 108 to a desired output voltage value (e.g., 5 to 12 V dc). Startup may be a period of time starting from when power converter 100 is introduced to $V_{IN}$ 106 until the control circuits of power converter 100 begin operating to regulate the output voltage $V_{OUT}$ 108 of power converter 100. Accordingly, output voltage $V_{OUT}$ 108 may be referred to as a "regulated output voltage." Output terminals 104 are coupled to an output capacitor 110 to smooth out regulated output voltage $V_{OUT}$ 108. As shown, output voltage $V_{OUT}$ 108 is referenced to output terminal 104-2, which may be referred to as an "output return 104-2."

Power converter 100 includes an energy transfer element 112. Energy transfer element 112 includes a primary winding 114 and a secondary winding 116. Energy transfer element 112 is coupled to transfer energy from primary winding 114 to secondary winding 116. In one example, energy transfer element 112 may be a coupled inductor. Circuits that are electrically coupled between input terminals 102 and primary winding 114 may be referred to as the "primary side" of power converter 100. Circuits that are electrically coupled between secondary winding 116 and output terminals 104 may be referred to as the "secondary side" of power converter 100. Energy transfer element 112 provides galvanic isolation between circuits on the primary side of power converter 100 and circuits on the secondary side of power converter 100. Accordingly, a dc voltage applied between the primary side and the secondary side of power converter 100 will produce substantially zero current.

Power converter 100 includes a primary side control circuit 118 (hereinafter "primary controller 118"), a secondary side control circuit 120 (hereinafter "secondary controller 120"), and a power switch 122. Primary controller 118, secondary controller 120, and power switch 122 are included in an integrated circuit package 124, which is illustrated as a box in FIG. 1.

In one example, integrated circuit package 124 may include a first integrated circuit die and a second integrated circuit die within an encapsulation. An encapsulation may refer to an encasing or molding that surrounds or encloses one or more integrated circuit dice and a portion of a lead frame. The first integrated circuit die may include primary controller 118 and power switch 122. The second integrated circuit die may include secondary controller 120. In another example, integrated circuit package 124 may include three integrated circuit dice within an encapsulation. For example, integrated circuit package 124 may include a first integrated circuit die that includes power switch 122, a second integrated circuit die that includes primary controller 118, and a third integrated circuit die that includes secondary controller 120.

The integrated circuit dice including primary controller 118 and secondary controller 120 are galvanically isolated from one another. Accordingly, secondary controller 120 is galvanically isolated from primary controller 118 and power switch 122. Although primary controller 118 and secondary controller 120 are galvanically isolated from one another, primary controller 118 and secondary controller 120 may communicate with one another. In one example, secondary controller 120 may communicate with primary controller 118 via a communication link. In one example, the communication link may be a magnetically coupled communication link. An example magnetically coupled communication link is described with reference to FIG. 7A). In another example, secondary controller 120 may communicate with primary controller 118 through an optically coupled communication link. An example optically coupled communication link is described with reference to FIG. 7B). In other examples, secondary controller 120 may communicate with primary controller 118 through other types of communication links, such as a capacitive communication link.

Although primary controller 118, secondary controller 120, and power switch 122 are illustrated as included in a single integrated circuit package, in other examples, one or more of primary controller 118, secondary controller 120, and power switch 122 may be located outside of the illustrated integrated circuit package. For example, power switch 122 may be included in an integrated circuit package that is separate from another integrated circuit package that includes both primary controller 118 and secondary controller 120.

Circuits external to integrated circuit package 124 may electrically couple to package terminals D 126-1, S 126-2, PBP 126-3, FWD 126-4, BP 126-5, GND 126-6, and FB 126-7 (collectively "package terminals 126") of integrated circuit package 124. Package terminals 126 of integrated circuit package 124 may include conductive pins and/or conductive pads for connection to circuits external to integrated circuit package 124.

Package terminals 126 may connect to terminals (e.g., on integrated circuit die) of power switch 122, primary controller 118, and secondary controller 120 included inside encapsulation of integrated circuit package 124. Power switch 122 includes terminals D 128-1 and S 128-2. Primary controller 118 includes terminal PBP 128-3. Secondary controller 120 includes terminals FWD 128-4, BP 128-5, GND 128-6, and FB 128-7. Terminals D 128-1, S 128-2, PBP 128-3, FWD 128-4, BP 128-5, GND 128-6, and FB 128-7 may be conductive connections included on the integrated circuit die that include power switch 122, primary controller 118, and secondary controller 120. GND terminal 128-6 is coupled to output terminal 104-2. In one example, GND terminal 128-6 may be the output return for secondary controller 120.

Primary controller 118 is coupled to circuit components of the primary side of power converter 100, such as power switch 122. Secondary controller 120 is coupled to circuit components of the secondary side of power converter 100. For example, secondary controller 120 may be coupled to secondary winding 116 and a bypass capacitor 130. Secondary controller 120 may also be coupled to output terminals 104 via feedback circuits (not shown) that allow secondary controller 120 to sense an output quantity of power converter 100 (e.g., output voltage $V_{OUT}$ 108 and/or output current $I_{OUT}$ 109). For example, power converter 100 of FIG. 1 may include feedback circuits between output terminals 104 and feedback terminal FB 126-7 that generate a feedback voltage $V_{FB}$ 132 that is representative of output voltage $V_{OUT}$ 108. Although power converter 100 of FIG. 1 may include feedback circuits that generate feedback voltage $V_{FB}$ 132, in other examples, power converter 100 may include circuits that generate a feedback current that is representative of output current $I_{OUT}$ 109. Primary controller 118 and secondary controller 120 control circuits of power converter 100 (e.g., power switch 122) to control energy transfer from input terminals 102 to output terminals 104.

Secondary controller 120 receives power from the secondary side of power converter 100. For example, secondary controller 120 may receive power from bypass capacitor 130 which is coupled to secondary controller 120 at bypass terminal BP 128-5 and ground terminal GND 128-6. Bypass capacitor 130 may supply power to circuits of secondary controller 120 such as timing circuit 258 (FIG. 2) and secondary switch control circuit 256 (FIG. 2). Secondary controller 120 may include circuits that regulate bypass voltage $V_{BP}$ 134 across bypass capacitor 130 (e.g., at approximately 4 to 5 V). In some examples, secondary controller 120 may include circuits that charge bypass capacitor 130 from forward terminal FWD 128-4, e.g., during startup and operation.

Although primary controller 118 and secondary controller 120 are galvanically isolated from one another, secondary controller 120 may transmit an energy request signal $U_{REQ}$ 136 (hereinafter "request signal $U_{REQ}$ 136") to primary controller 118. For example, secondary controller 120 may transmit request signal $U_{REQ}$ 136 via a communication link, e.g., a magnetic, capacitive, or an optical communication link. As described herein, primary controller 118 may set power switch 122 into an ON state in response to a request signal $U_{REQ}$ 136 received from secondary controller 120.

Power switch 122 may be a high voltage power switch, which may have a breakdown voltage in the range of 700-800 V. In one example, power switch 122 may be a power metal-oxide-semiconductor field-effect transistor (power MOSFET), as illustrated in FIG. 2. Power switch 122 is coupled to primary winding 114 and input return 102-2. In examples where power switch 122 is a power MOSFET, the drain of the power MOSFET may be coupled to drain terminal D 128-1 and the source of the power MOSFET may be coupled to source terminal S 128-2, as illustrated in FIG. 2.

Primary controller 118 controls current through power switch 122 and primary winding 114 by controlling the state of power switch 122. Current through power switch 122 may be referred to herein as "switch current." In general, power switch 122 may be in an "ON" state (e.g., a closed switch) or an "OFF" state (e.g., an open switch), in response to a switch drive signal $U_{DRIVE}$ 138 generated by primary controller 118. When power switch 122 is in the ON state (e.g., a closed switch), power switch 122 may conduct current. When power switch 122 is in the OFF state (e.g., an open switch), power switch 122 may not conduct current when a voltage is applied across power switch 122.

Primary controller 118 generates switch drive signal $U_{DRIVE}$ 138 to control the state of power switch 122. In an example where power switch 122 is a power MOSFET, primary controller 118 may be coupled to the gate of the power MOSFET, as illustrated in FIG. 2. In this example, primary controller 118 applies a gate-to-source voltage that is greater than the threshold voltage of the power MOSFET to set the power MOSFET into the ON state. Primary controller 118 applies a gate-to-source voltage that is less than the threshold voltage of the power MOSFET to set the power MOSFET into the OFF state.

Primary controller 118 receives operating power from input terminals 102 and/or primary bypass capacitor 140. In one example, primary controller 118 may also receive operating power from a low voltage winding (not shown in FIG. 1) forming part of energy transfer element 112. Primary bypass capacitor 140 may store energy received from input terminals 102 when input voltage $V_{IN}$ 106 is provided at input terminals 102. Energy stored on primary bypass capacitor 140 may be used as operating power by primary controller 118, e.g., to generate switch drive signal $U_{DRIVE}$ 138.

When power switch 122 is in the ON state, current through primary winding 114 increases, storing energy in energy transfer element 112. Additionally, a primary winding voltage $V_P$ 142 with a first polarity develops across primary winding 114 while power switch 122 is in the ON state. A secondary winding voltage $V_S$ 144 of opposite polarity with respect to primary winding voltage $V_P$ 142 develops across secondary winding 116 while power switch 122 is in the ON state. Diode $D_1$ 146 may be reverse-biased when power switch 122 is in the ON state.

When power switch 122 is in the OFF state, power switch 122 may act as an open circuit and substantially prevent current through power switch 122. When power switch 122 transitions from the ON state to the OFF state, the polarity of secondary winding voltage $V_S$ 144 reverses and energy is transferred to output capacitor 110, which provides power to an electrical load connected to output terminals 104. Diode $D_1$ 146 may allow charging of output capacitor 110 and the delivery of energy to a load after power switch 122 transitions to the OFF state. Although a passive rectification component (i.e., diode $D_1$ 146) is illustrated in FIG. 1, in other examples, power converter 100 may include a synchronous rectification switch (e.g., a MOSFET) that may be controlled by secondary controller 120. In some examples, a synchronous rectification switch maybe integrated as a separate die inside integrated circuit package 124. Clamp circuit 148 is coupled to primary winding 114 of energy transfer element 112 to limit the maximum voltage on power switch 122 when power switch 122 transitions between an ON state and an OFF state.

Secondary controller 120 may sense an output quantity of power converter 100 (e.g., output current $I_{OUT}$ 109 and/or output voltage $V_{OUT}$ 108). For example, secondary controller 120 of FIG. 1 senses feedback voltage $V_{FB}$ 132 at feedback terminal FB 128-7 (e.g., with respect to GND terminal 128-6). In one example, feedback voltage $V_{FB}$ 132 sensed at feedback terminal FB 128-7 is a scaled down voltage, e.g., by a resistor divider circuit, that is representative of output voltage $V_{OUT}$ 108 of power converter 100. Although example secondary controller 120 of FIG. 1 senses output voltage $V_{OUT}$ 108 of power converter 100, it is contemplated that, in some examples, secondary controller 120 may sense other output quantities, such as output current $I_{OUT}$ 109 and/or a combination of output voltage $V_{OUT}$ 108 and output current $I_{OUT}$ 109 of power converter 100.

As described herein, primary controller 118 and secondary controller 120 may operate to regulate an output quantity (e.g., output voltage $V_{OUT}$ 108 and/or output current $I_{OUT}$ 109) of power converter 100. For example, primary controller 118 and secondary controller 120 may operate to regulate output voltage $V_{OUT}$ 108 to a desired output voltage value in response to a sensed feedback voltage $V_{FB}$ 132. In general, in circumstances when output voltage $V_{OUT}$ 108 drops to a value that is less than the desired output voltage value, primary controller 118 and secondary controller 120 may operate to increase output voltage $V_{OUT}$ 108 until output voltage $V_{OUT}$ 108 has reached the desired output voltage value. Although primary controller 118 and secondary controller 120 may regulate output voltage $V_{OUT}$ 108 in response to feedback voltage $V_{FB}$ 132, in some examples, primary controller 118 and secondary controller 120 may regulate output voltage $V_{OUT}$ 108 and/or output current $I_{OUT}$ 109 in response to sensed output current $I_{OUT}$ 109 and/or feedback voltage $V_{FB}$ 132.

Secondary controller 120 transmits request signal $U_{REQ}$ 136 to primary controller 118. Primary controller 118 generates a switch drive signal $U_{DRIVE}$ 138 that sets power switch 122 into the ON state in response to receiving request signal $U_{REQ}$ 136 from secondary controller 120. After primary controller 118 sets power switch 122 into the ON state in response to request signal $U_{REQ}$ 136, primary controller 118 determines when to set power switch 122 into the OFF state. After power switch 122 has been in the ON state for a period of time, primary controller 118 transitions power switch 122 from the ON state to the OFF state at the time determined by primary controller 118, which may then result in a transfer of energy to the secondary side of power converter 100. Power switch 122 may then be maintained in the OFF state by primary controller 118 until primary controller 118 receives another request signal $U_{REQ}$ 136.

Secondary controller 120 may transmit multiple consecutive request signals $U_{REQ}$ 136 over a period of time. Primary controller 118 may set power switch 122 into the ON state in response to each of the transmitted request signals $U_{REQ}$ 136. As described herein, primary controller 118 and secondary controller 120 may be configured such that the amount of time between consecutive request signals $U_{REQ}$ 136 is greater than the amount of time during which power switch 122 is in the ON state. Accordingly, in response to multiple consecutive request signals $U_{REQ}$ 136, primary controller 118 may transition power switch 122 into the ON state and back into the OFF state multiple consecutive times. As described herein, the timing between the transmission of request signals $U_{REQ}$ 136 may vary, e.g., depending on loading conditions. Accordingly, the timing between transitions of power switch 122 into the ON state may vary.

In some examples, request signal $U_{REQ}$ 136 may be a pulse that is transmitted by secondary controller 120 and detected by primary controller 118. In these examples, secondary controller 120 may transmit a plurality of consecutive pulses which may be separated by similar or different amounts of time. Primary controller 118 may set power switch 122 into the ON state in response to each pulse of the plurality of consecutive pulses.

After primary controller 118 sets power switch 122 into the ON state, primary controller 118 determines when to set power switch 122 into the OFF state. Primary controller 118 may set power switch 122 into the OFF state in response to one or more "turn-off conditions." Put another way, primary controller 118 may generate a switch drive signal $U_{DRIVE}$ 138 that sets power switch 122 into the OFF state when primary controller 118 detects one or more turn-off conditions.

In one example, a turn-off condition may include an amount of current through power switch 122. In this example, primary controller 118 may sense an amount of current through power switch 122 (i.e., switch current) when power switch 122 is in the ON state. Primary controller 118 may then set power switch 122 into an OFF state when the switch current reaches a threshold current limit while power switch 122 is in the ON state. In another example, a turn-off condition may include a threshold amount of time, referred to herein as a "conduction period." In this example, primary controller 118 may be coupled to set power switch 122 into the ON state for a conduction period in response to request signal $U_{REQ}$ 136, and then set power switch 122 into the OFF state after the conduction period has expired. Although turn-off conditions may include a threshold current limit and/or a conduction period, it is contemplated that primary controller 118 may set power switch 122 into the OFF state in response to other conditions. The turn-off conditions (e.g., threshold current limit and/or the conduction period) may be fixed quantities in some examples. In other examples, primary controller 118 may adjust the turn-off conditions, e.g., in response to loading conditions detected by primary controller 118.

In summary, since primary controller 118 sets power switch 122 into the ON state in response to request signal $U_{REQ}$ 136 generated by secondary controller 120, secondary controller 120 of the present disclosure may control when power switch 122 is set into the ON state. Additionally, since primary controller 118 determines when to transition power switch 122 from the ON state into the OFF state, primary controller 118 controls how long power switch 122 remains in the ON state. As described hereinafter with respect to FIG. 2, secondary controller 120 may include a timing circuit (e.g., timing circuit 258) that controls how often request signals $U_{REQ}$ 136 are sent to primary controller 118. In other words, secondary controller 120 may control how often power switch 122 may be set into the ON state by primary controller 118. Accordingly, secondary controller 120 may control the rate (e.g., the max rate) at which power switch 122 is set into the ON state.

Operation of example circuits included in primary controller 118 and secondary controller 120 is now described in greater detail with respect to FIG. 2. FIG. 2 shows an example integrated circuit package 224 that includes a power switch 222 (e.g., power MOSFET 222), an example primary controller 218, and an example secondary controller 220. Circuits external to integrated circuit package 224 may electrically couple to package terminals D 226-1, S 226-2, PBP 226-3, FWD 226-4, BP 226-5, GND 226-6, and FB 226-7 (collectively "package terminals 226") of integrated circuit package 224.

Package terminals 226 may connect to terminals D 228-1, S 228-2, PBP 228-3, FWD 228-4, BP 228-5, GND 228-6, and FB 228-7 of power switch 222, primary controller 218, and secondary controller 220 included on the inside of integrated circuit package 224. Package terminals 226 may be connected to a power converter in a similar manner as illustrated in FIG. 1. Accordingly, the description of integrated circuit package 224 may hereinafter reference the components of power converter 100 of FIG. 1.

Primary controller 218 includes a primary switch control circuit 250, a current sense circuit 252, and memory circuit 254. Secondary controller 220 includes a secondary switch control circuit 256 and a timing circuit 258. Primary controller 218 and secondary controller 220 may include additional circuits that are not illustrated in FIG. 2. For example, primary controller 218 may include circuits that couple to terminal PBP 228-3 to provide power to primary controller 218. Secondary controller 220 may include circuits that charge bypass capacitor 130. For example, secondary controller 220 may include circuits that couple to forward terminal FWD 228-4 and bypass terminal BP 228-5 to charge bypass capacitor 130 from forward terminal FWD 228-4. Ground terminal GND 228-6 may be the output return for circuits of secondary controller 220.

In some examples, secondary controller 220 may include additional terminals that are not illustrated in FIGS. 1-2, such as a terminal that is coupled to output terminal 104-1. In these examples, secondary controller 220 may include circuits that charge bypass capacitor 130 from output terminal 104-1. For example, secondary controller 220 may charge bypass capacitor 130 from forward terminal FWD 228-4 and/or the additional terminal coupled to output terminal 104-1. Charging bypass capacitor 130 from output terminal 104-1 during operation may be more efficient than charging bypass capacitor 130 from forward terminal FWD 228-4.

Primary switch control circuit 250 generates switch drive signal $U_{DRIVE}$ 238 that sets the state of power switch 222. Primary switch control circuit 250 may maintain power switch 222 in the OFF state until primary switch control circuit 250 receives request signal $U_{REQ}$ 236 from secondary switch control circuit 256. Primary switch control circuit 250 transitions power switch 222 from the OFF state to the ON state in response to receiving request signal $U_{REQ}$ 236.

After setting power switch 222 into the ON state, primary switch control circuit 250 determines when to set power switch 222 into the OFF state. For example, primary switch control circuit 250 may set power switch 222 into the OFF state in response to detection of one or more turn-off conditions. In one example, a turn-off condition may be an amount of switch current $I_{SWITCH}$ 260 through power switch 222 (i.e., a threshold current limit). In other examples, a turn-off condition may be a threshold amount of time (i.e., a conduction period).

Memory circuit 254 may store the one or more turn-off conditions. For example, memory circuit 254 may store the threshold current limit and/or the conduction period. In some examples, turn-off conditions may have fixed values. In other examples described herein, primary switch control circuit 250 may adjust the values of the turn-off conditions. For example, primary switch control circuit 250 may determine loading conditions of power converter 100 and adjust the turn-off conditions in memory circuit 254 in response to determined loading conditions.

In some examples, memory circuit 254 may include circuits that count a number of request signals $U_{REQ}$ 236 received from secondary switch control circuit 256. The number of request signals $U_{REQ}$ 236 received over a period of time may be indicative of loading conditions at the output of power converter 100. In these examples, primary switch control circuit 250 may determine when to set power switch 222 into the OFF state based on the count maintained by memory circuit 254. In other examples, memory circuit 254 may include a capacitor that may be charged while power switch 222 is in the ON state and discharged while power switch 222 is in the OFF state. In these examples, the voltage across the capacitor of memory circuit 254 may indicate the amount of time power switch 222 has been in the ON state over a period of time, which may indicate loading conditions at the output of power converter 100. Primary switch control circuit 250 may determine when to set power switch 222 into the OFF state in response to the voltage across the capacitor of memory circuit 254.

Current sense circuit 252 may sense an amount of switch current $I_{SWITCH}$ 260 through power switch 222 when power switch 222 is in the ON state. Primary switch control circuit 250 may determine when the amount of current through power switch 222 has reached the threshold current limit based on the amount of current sensed by current sense circuit 252. In examples where a threshold current limit is a turn-off condition, primary switch control circuit 250 sets power switch 222 into the OFF state in response to a determination that the current through power switch 222 has reached the threshold current limit.

In examples where primary switch control circuit 250 uses a threshold amount of time as a turn-off condition (i.e., a conduction period), primary switch control circuit 250 may determine the amount of time that has elapsed since primary switch control circuit 250 has set power switch 222 into the ON state. In these examples, primary switch control circuit 250 sets power switch 222 into the OFF state after power switch 222 has been in the ON state for one conduction period.

In some examples, primary switch control circuit 250 may set power switch 222 into the OFF state in response to a threshold current limit without monitoring the amount of time power switch 222 has been in the ON state. In other examples, primary switch control circuit 250 may not monitor the amount of current through power switch 222, but instead, primary switch control circuit 250 may set power switch 222 into the OFF state after power switch 222 has been in the ON state for one conduction period. In still other examples, primary switch control circuit 250 may set power switch 222 into the OFF state in response to more than one turn-off condition. For example, primary switch control circuit 250 may set power switch 222 into the OFF state when a conduction period has passed or when the threshold current limit is reached, whichever occurs first. Although turn-off conditions may include at least one of a threshold time limit (i.e., a conduction period) and a threshold current limit, it is contemplated that other turn-off conditions may be used by primary switch control circuit 250 to determine when to set power switch 222 into the OFF state.

Timing circuit 258 and secondary switch control circuit 256 control when request signals $U_{REQ}$ 236 are sent to primary controller 218, which in turn controls when power switch 222 is set into an ON state. As described herein, secondary switch control circuit 256 may generate request signal $U_{REQ}$ 236 in response to a state of timing circuit 258 and a sensed output quantity of power converter 100 (e.g., feedback voltage $V_{FB}$ 132).

Timing circuit 258 may be set in one of a first state and a second state. In general, timing circuit 258 may be in the first state until timing circuit 258 is triggered by secondary switch control circuit 256 to transition to the second state. As described herein, when timing circuit 258 is in the second state, secondary switch control circuit 256 may decide to withhold transmission of request signal $U_{REQ}$ 236. In some examples, timing circuit 258 may be implemented using an oscillator circuit (e.g., an RC oscillator circuit). Although timing circuit 258 is illustrated and described herein as operating in one of a first state and a second state, it is contemplated that the functionality associated with timing circuit 258 may be implemented using a variety of different circuit components.

When timing circuit 258 is triggered by secondary switch control circuit 256, timing circuit 258 may transition from the first state to the second state and remain in the second state for a period of time, referred to herein as a "holding period." After timing circuit 258 has been in the second state for a holding period, timing circuit 258 may transition back to the first state. Timing circuit 258 may stay in the first state until triggered by secondary switch control circuit 256 to return to the second state for a holding period. In another example, timing circuit 258 may include an oscillator (not shown) that periodically sets timing circuit 258 to the first state, and is then automatically set back to the second state independent of output voltage $V_{OUT}$ 108. In other words, the timing circuit 258 is periodically set to a first state at the beginning of a switching cycle period and is then automatically set back to the second state. In this manner, transmission of request signal $U_{REQ}$ 236 may only occur at set times, based on the frequency of the oscillator (not shown) in timing circuit 258.

Secondary switch control circuit 256 receives feedback voltage $V_{FB}$ 132 that is representative of output voltage $V_{OUT}$ 108. Secondary switch control circuit 256 determines when output voltage $V_{OUT}$ 108 is less than a desired output voltage value based on the value of feedback voltage $V_{FB}$ 132. Secondary switch control circuit 256 may also determine the state of timing circuit 258. For example, secondary switch control circuit 256 may determine whether timing circuit 258 is in the first state or the second state.

Secondary switch control circuit 256 transmits request signal $U_{REQ}$ 236 and triggers timing circuit 258 when secondary switch control circuit 256 determines that timing circuit 258 is in the first state and output voltage $V_{OUT}$ 108 is less than the desired output voltage value. For example, secondary switch control circuit 256 may transmit request signal $U_{REQ}$ 236 to primary controller 218 and also generate a trigger signal on the secondary side that triggers timing circuit 258 to enter the second state. Secondary switch control circuit 256 may transmit request signal $U_{REQ}$ 236 and also trigger timing circuit 258 at approximately the same time. Since primary controller 218 sets power switch 222 into the ON state in response to request signal $U_{REQ}$ 236, timing circuit 258 may transition to the second state at approximately the same time as power switch 222 is set into the ON state by primary controller 218.

In circumstances when timing circuit 258 is in the second state or output voltage $V_{OUT}$ 108 is greater than the desired output voltage value, secondary switch control circuit 256 may decide to withhold transmission of request signal $U_{REQ}$ 236. In one circumstance, when output voltage $V_{OUT}$ 108 is greater than the desired output voltage value and timing circuit 258 is in the first state, secondary switch control circuit 256 may withhold transmission of request signal $U_{REQ}$ 236 until output voltage $V_{OUT}$ 108 drops to a value that is less than the desired output voltage value. In this example, secondary switch control circuit 256 may transmit request signal $U_{REQ}$ 236 and trigger timing circuit 258 to enter the second state when the output voltage $V_{OUT}$ 108 drops to less than the desired output voltage value. In another circumstance, when output voltage $V_{OUT}$ 108 is less than the desired output voltage value and timing circuit 258 is in the second state, secondary switch control circuit 256 may decide to withhold transmission of request signal $U_{REQ}$ 236 until timing circuit 258 transitions to the first state. In this example, secondary switch control circuit 256 may transmit request signal $U_{REQ}$ 236 and trigger timing circuit 258 back to the second state in response to timing circuit 258 entering the first state, assuming that output voltage $V_{OUT}$ 108 is still less than the desired output voltage value when timing circuit 258 enters the first state.

Secondary switch control circuit 256 controls the rate at which request signals $U_{REQ}$ 236 are transmitted to primary controller 218. Put another way, secondary switch control circuit 256 controls how many request signals $U_{REQ}$ 236 are transmitted to primary controller 218 during a period of time. As described herein, multiple consecutive request signals $U_{REQ}$ 236 may be separated from one another by varying amounts of time, depending on when secondary switch control circuit 256 determines when to transmit request signals $U_{REQ}$ 236. Accordingly, secondary switch control circuit 256 may control the rate at which power switch 222 is set into the ON state since primary switch control circuit 250 sets power switch 222 into the ON state in response to each request signal $U_{REQ}$ 236.

Secondary switch control circuit 256 may control the rate at which request signals $U_{REQ}$ 236 are sent to primary switch control circuit 250 in response to an amount of loading at output terminals 104 of power converter 100. For example, secondary switch control circuit 256 may tend to transmit request signals $U_{REQ}$ 236 at a greater rate during heavier loading since output voltage $V_{OUT}$ 108 may tend to drop below the desired output voltage value faster during heavier loading. In examples where the loading at output terminals 104 decreases, secondary switch control circuit 256 may tend to transmit request signals $U_{REQ}$ 236 at a lower rate than when heavier loading is present at output terminals 104.

When timing circuit 258 is triggered to enter the second state by secondary switch control circuit 256, timing circuit 258 may remain in the second state for a holding period until timing circuit 258 transitions back to the first state. The holding period of timing circuit 258 may set a maximum rate at which request signals $U_{REQ}$ 236 may be transmitted since secondary switch control circuit 256 withholds transmission of a request signal $U_{REQ}$ 236 while timing circuit 258 is in the second state. Accordingly, the holding period of timing circuit 258 may set a maximum rate at which power switch 222 may be set into the ON state. Put another way, the holding period may be approximately equal to the minimum time between two consecutive request signals $U_{REQ}$ 236, or two consecutive transitions of power switch 222 into the ON state. In circumstances where output voltage $V_{OUT}$ 108 is below the desired output voltage value when timing circuit 258 transitions from the second state to the first state, request signals $U_{REQ}$ 236 may be spaced by approximately one holding period. Such circumstances may arise during heavy loading, which may cause secondary switch control circuit 256 to transmit request signals $U_{REQ}$ 236 that are each separated by approximately one holding period.

The holding period of timing circuit 258 may be set to a value that allows a sufficient amount of time for energy to be transferred from the primary side of power converter 100 to the secondary side. For example, the holding period may be set to a value that allows for energy transfer to the secondary side after primary switch control circuit 250 has transitioned power switch 222 from the ON state to the OFF state. Since primary switch control circuit 250 determines how long power switch 222 remains in the ON state, the holding period of timing circuit 258 and the turn-off conditions of power switch 222 may be selected such that a sufficient amount of energy is transferred after power switch 222 is set into the OFF state. For example, the holding period may be selected to be greater than an expected amount of time power switch 222 will remain in the ON state plus an expected amount of time that allows for sufficient energy transfer to the secondary side after power switch 222 is set into the OFF state.

Primary switch control circuit 250 may adjust the turn-off conditions (e.g., threshold current limit and/or the conduction period) in response to loading conditions of the power converter 100. In some examples, primary switch control circuit 250 may determine loading conditions based on how long power switch 222 is in the ON state during a period of time. In general, power switch 222 may be maintained in the ON state more often during heavier loading conditions. In these examples, primary switch control circuit 250 may determine that heavier loading conditions exist when power switch 222 is maintained in the ON state for a greater amount of time during a given time period. Similarly, primary switch control circuit 250 may determine that lighter loading conditions exist when power switch 222 is maintained in the ON state for a lesser amount of time during the given time period.

In other examples, primary switch control circuit 250 may determine loading conditions based on how many request signals $U_{REQ}$ 236 are received by primary switch control circuit 250 over a period of time. In general, primary switch control circuit 250 may receive a greater number of request signals $U_{REQ}$ 236 during heavier loading conditions. In these examples, primary switch control circuit 250 may determine that heavier loading conditions exist when a greater number of request signals $U_{REQ}$ 236 are received during a given time period. Similarly, primary switch control circuit 250 may determine that lighter loading conditions exist when a lesser number of request signals $U_{REQ}$ 236 are received during the given time period.

In other examples, primary switch control circuit 250 may determine loading conditions based on the amount of time between consecutive request signals $U_{REQ}$ 236 received by primary switch control circuit 250. In general, the amount of time between consecutive request signals $U_{REQ}$ 236 may be less during heavier loading conditions than during lighter loading conditions. In these examples, primary switch control circuit 250 may determine that heavier loading conditions exist when the amount of time between consecutive request signals $U_{REQ}$ 236 is less than a threshold amount of time. Similarly, primary switch control circuit 250 may determine that lighter loading conditions exist when the amount of time between consecutive request signals $U_{REQ}$ 236 is greater than the threshold amount of time.

In examples where primary switch control circuit 250 detects an increase in loading, primary switch control circuit 250 may adjust the turn-off conditions in memory circuit 254 such that power switch 222 is maintained in the ON state for a greater amount of time. Maintaining power switch 222 in the ON state for a greater amount of time may result in more energy transfer to output terminals 104 during increased loading. In examples where a threshold current limit is used as a turn-off condition, primary switch control circuit 250 may increase the value of the threshold current limit so that power switch 222 may remain in the ON state for a greater amount of time. In examples where a threshold time limit (i.e., conduction period) is used as a turn-off condition, primary switch control circuit 250 may increase the duration of the conduction period so that power switch 222 may remain in the ON state for a greater amount of time.

In examples where primary switch control circuit 250 detects a decrease in loading, primary switch control circuit 250 may adjust the turn-off conditions in memory circuit 254 such that power switch 222 is maintained in the ON state for a lesser amount of time. Maintaining power switch 222 in the ON state for a lesser amount of time may result in less energy transfer to output terminals 104 during decreased loading. In examples where a threshold current limit is used as a turn-off condition, primary switch control circuit 250 may decrease the value of the threshold current limit so that power switch 222 may remain in the ON state for a lesser amount of time. In examples where a threshold time limit (i.e., conduction period) is used as a turn-off condition, primary switch control circuit 250 may decrease the duration of the conduction period so that power switch 222 may remain in the ON state for a lesser amount of time.

In some examples, primary switch control circuit 250 may be coupled to ignore a received request signal $U_{REQ}$ 236. In other words, in some examples, primary switch control circuit 250 may refrain from switching power switch 222 into the ON state when a request signal $U_{REQ}$ 236 is received. For example, primary switch control circuit 250 may ignore a received request signal during abnormal or fault conditions. Abnormal or fault conditions may include circumstances where switch current $I_{SWITCH}$ 260 fails to reach a threshold current limit within an expected period of time, e.g., due to an abnormally low input voltage $V_{IN}$ 106. Other abnormal or fault conditions may also include circumstances in which noise induced in the communication link may appear to be a request signal transmitted from secondary switch control circuit 256. Such noise may be induced in the communication link by switching of power switch 222, or operation of other circuits of primary controller 218, secondary controller 220. In other examples, noise may also originate from other electronic equipment in the vicinity. Under these conditions, primary switch control circuit 250 may receive a request signal $U_{REQ}$ 236 when power switch 222 is in the ON state or when power switch 222 has just transitioned to the OFF state. Primary switch control circuit 250 may ignore a received request signal $U_{REQ}$ 236 if the request signal $U_{REQ}$ 236 is received while primary switch control circuit 250 has power switch 222 set in the ON state. Similarly, primary switch control circuit 250 may ignore a received request signal $U_{REQ}$ 236 if the request signal $U_{REQ}$ 236 is received immediately after (e.g., within a threshold amount of time) primary switch control circuit 250 transitions power switch 222 to the OFF state. In general, primary controller 218 and secondary controller 220 are configured such that request signals $U_{REQ}$ 236 are not sent close enough together that a request signal is received while power switch 222 is in the ON state.

Primary switch control circuit 250 may also ignore a request signal $U_{REQ}$ 236 under other fault conditions. In one example, primary switch control circuit 250 may determine when a component (e.g., power switch 222) is overheated, or susceptible to overheating. In response to such a determination, primary switch control circuit 250 may ignore a request signal $U_{REQ}$ 236 and refrain from setting power switch 222 into the ON state so that power switch 222, or other component, does not become thermally damaged if normal switching were to be maintained. In these examples, primary switch control circuit 250 may include circuits that sense temperature, or a temperature sensor that is readable by primary switch control circuit 250 may be included external to primary controller 218. In another example, primary switch control circuit 250 may detect when input voltage exceeds an input voltage threshold that may damage power switch 222. In these examples, primary switch control circuit 250 may ignore a received request signal $U_{REQ}$ 236 when primary switch control circuit 250 determines that an input voltage may damage power switch 222 if normal switching is maintained.

FIG. 3 is a flow diagram that describes operation of secondary controller 220. Prior to the start of method 300, it may be assumed that timing circuit 258 is in the first state and that output voltage $V_{OUT}$ 108 has dropped to a value that is less than the desired output voltage value. In block 302, secondary switch control circuit 256 decides to transmit request signal $U_{REQ}$ 236 in response to determining that timing circuit 258 is in the first state and that output voltage $V_{OUT}$ 108 is less than the desired output voltage value. In block 304, secondary switch control circuit 256 triggers timing circuit 258 to transition from the first state to the second state. For example, secondary switch control circuit 256 may trigger timing circuit 258 at approximately the same time that secondary switch control circuit 256 transmits request signal $U_{REQ}$ 236.

After timing circuit 258 is triggered by secondary switch control circuit 256, timing circuit 258 may remain in the second state for a holding period. In block 306, secondary switch control circuit 256 determines whether the holding period has expired. Secondary switch control circuit 256 may determine that the holding period has not expired if timing circuit 258 is in the second state. Secondary switch control circuit 256 may determine that the holding period has expired when timing circuit 258 is in the first state. Accordingly, if secondary switch control circuit 256 determines that timing circuit 258 is in the second state, secondary switch control circuit 256 may continue to monitor the state of timing circuit 258 in block 306.

After the holding period has expired, timing circuit 258 transitions to the first state in block 308. Upon transitioning to the first state, secondary switch control circuit 256 may determine that timing circuit 258 is in the first state in block 308. In block 310, secondary switch control circuit 256 senses an output quantity of power converter 100, such as output voltage $V_{OUT}$ 108 and/or output current $I_{OUT}$ 109. If the sensed output quantity is not less than a desired output quantity (e.g., a desired output voltage value) in block 312, then secondary switch control circuit 256 may continue to sense the output quantity of power converter 100 in block 310. Since timing circuit 258 is in the first state, if secondary switch control circuit 256 determines that the sensed output quantity is less than a desired output quantity in block 312, secondary switch control circuit 256 may transmit request signal $U_{REQ}$ 236 in block 302.

FIG. 4 is a flow diagram that describes operation of primary controller 218. Prior to the start of method 400, it may be assumed that primary switch control circuit 250 is maintaining power switch 222 in the OFF state. In block 402, primary switch control circuit 250 determines whether request signal $U_{REQ}$ 236 has been received. If primary switch control circuit 250 does not detect request signal $U_{REQ}$ 236, primary switch control circuit 250 may continue waiting for request signal $U_{REQ}$ 236 in block 402.

If primary switch control circuit 250 receives request signal $U_{REQ}$ 236, primary switch control circuit 250 may adjust or maintain the turn-off conditions in block 404. For example, primary switch control circuit 250 may adjust the turn-off conditions in memory circuit 254 in response to changing loading conditions. In other examples, primary switch control circuit 250 may maintain the turn-off conditions in memory circuit 254 when loading conditions have not changed. Although primary switch control circuit 250 may adjust/maintain the turn-off conditions after request signal $U_{REQ}$ 236 is received in block 402, it is contemplated that primary switch control circuit 250 may adjust/maintain the turn-off conditions at other times during operation (e.g., after block 406). Although primary switch control circuit 250 may adjust the turn-off conditions in some examples, in other examples, the turn-off conditions may be fixed. In these examples, primary switch control circuit 250 may not adjust the turn-off conditions, and block 404 may be removed from method 400.

Primary switch control circuit 250 sets power switch 222 into the ON state in response to the received request signal $U_{REQ}$ 236 in block 406. In block 408, primary switch control circuit 250 determines whether a turn-off condition is detected. As described herein, a turn-off condition may include, but is not limited to, a threshold current limit and/or a threshold amount of time. If primary switch control circuit 250 does not detect a turn-off condition, primary switch control circuit 250 may maintain power switch 222 in the ON state and continue to monitor for turn-off conditions. If primary switch control circuit 250 detects a turn-off condition, primary switch control circuit 250 sets power switch 222 into the OFF state in block 410.

FIG. 5 is a flow diagram that describes operation of primary controller 218 and secondary controller 220. FIG. 5 describes transmission of a single request signal $U_{REQ}$ 236 and response of primary switch control circuit 250 to the single request signal $U_{REQ}$ 236. Although operation of primary controller 218 and secondary controller 220 are described with respect to transmission of a single request signal $U_{REQ}$ 236, method 500 may be repeated by primary controller 218 and secondary controller 220 during operation. For example, method 500 may loop back from block 520 to block 502 instead of ending after block 520.

In block 502, timing circuit 258 is in the first state. In block 504, secondary switch control circuit 256 senses an output quantity of power converter 100, such as output voltage $V_{OUT}$ 108 and/or output current $I_{OUT}$ 109. If the sensed output quantity is not less than a desired output quantity, then secondary switch control circuit 256 may continue to monitor the output quantity of power converter 100. If secondary switch control circuit 256 determines that the sensed output quantity is less than a desired output quantity in block 506, secondary switch control circuit 256 transmits request signal $U_{REQ}$ 236 and triggers timing circuit 258 in block 508.

In block 510, primary switch control circuit 250 receives request signal $U_{REQ}$ 236. Primary switch control circuit 250 sets power switch 222 into the ON state in block 512 in response to receiving request signal $U_{REQ}$ 236. In block 514, primary switch control circuit 250 may adjust or maintain the turn-off conditions. In block 516, primary switch control circuit 250 determines whether a turn-off condition is detected. If primary switch control circuit 250 does not detect a turn-off condition, primary switch control circuit 250 may maintain power switch 222 in the ON state and continue to monitor for turn-off conditions. If primary switch control circuit 250 detects a turn-off condition, primary switch control circuit 250 sets power switch 222 into the OFF state in block 518. As described above, the holding period may be selected to be greater than an expected amount of time power switch 222 will remain in the ON state plus an expected amount of time that allows for sufficient energy transfer to the secondary side after power switch 222 is set into the OFF state. Accordingly, in block 520, the holding period of timing circuit 258 ends and timing circuit 258 transitions to the first state.

FIG. 6 shows waveforms illustrating operation of primary controller 218 and secondary controller 220 under varying load conditions. Specifically, FIG. 6 shows switch current $I_{SWITCH}$ 260 and output voltage $V_{OUT}$ 108 waveforms along with corresponding timing circuit states (T.C. STATE), switch drive signals $U_{DRIVE}$ 238, and request signals $U_{REQ}$ 236. The timing circuit state waveform of FIG. 6 is meant to graphically illustrate the states of timing circuit 258. Although the timing circuit waveform of FIG. 6 illustrates the first and second states as corresponding to low and high values, respectively, such a representation of the timing circuit states is provided for explanation purposes. Accordingly, the timing circuit state waveform may or may not represent digital/analog values (e.g., voltages) associated with an implementation of timing circuit 258.

The left half of FIG. 6 illustrates operation of primary controller 218 and secondary controller 220 under heavier load conditions. The right half of FIG. 6 illustrates operation of primary controller 218 and secondary controller 220 under lighter load conditions. A time gap 661 between heavier and lighter load conditions is illustrated for each of the signals in FIG. 6.

At time zero, output voltage $V_{OUT}$ 108 is greater than the desired output voltage value (indicated by dashed line 662). Additionally, timing circuit 258 is in the first state. At 663, output voltage $V_{OUT}$ 108 drops to a value that is less than the desired output voltage value. Accordingly, at 663, secondary switch control circuit 256 transmits a request signal 664 and triggers timing circuit 258 to enter the second state. In response to receiving request signal 664, primary switch control circuit 250 generates switch drive signal $U_{DRIVE}$ 238 that sets power switch 222 into the ON state.

Primary switch control circuit 250 may then determine when to set power switch 222 into the OFF state. In FIG. 6, it may be assumed that primary switch control circuit 250 uses a threshold current limit as a turn-off condition. Additionally, it may be assumed that the threshold current limit is adjustable based on loading conditions. As illustrated at 665, primary switch control circuit 250 may adjust the threshold current limit to three different values ($I_{LIM1}$, $I_{LIM2}$, and $I_{LIM3}$), depending on loading conditions.

As indicated at 666, switch current $I_{SWITCH}$ 260 increases while power switch 222 is in the ON state. Primary switch control circuit 250 may sense switch current $I_{SWITCH}$ 260 and set power switch 222 into the OFF state when switch current $I_{SWITCH}$ 260 reaches a threshold current limit $I_{LIM2}$. Energy is transferred to the secondary side after power switch 222 is set into the OFF state. Although energy is transferred to the secondary side of power converter 100, output voltage $V_{OUT}$ 108 remains at a value that is less than the desired output voltage value.

After power switch 222 is set in the OFF state at 667, timing circuit 258 remains in the second state until expiration of the holding period at 668. Output voltage $V_{OUT}$ 108 is less than the desired output voltage value upon expiration of the holding period. Accordingly, upon expiration of the holding period, secondary switch control circuit 256 may trigger timing circuit 258 to return to the second state and also transmit request signal 669. The delay period 670 between two consecutive holding periods may represent a time period during which secondary switch control circuit 256 determines the state of timing circuit 258 and determines whether output voltage $V_{OUT}$ 108 is less than the desired output voltage value. $T_{MIN}$ in FIG. 6 may represent the minimum time between two consecutive request signals. In other words, $T_{MIN}$ may represent the minimum amount of time between two consecutive transitions of the power switch into the ON state.

Primary switch control circuit 250 may set power switch 222 into the ON state a second time at 671. At 672, primary switch control circuit 250 sets power switch 222 into the OFF state when switch current $I_{SWITCH}$ 260 reaches the threshold current limit $I_{LIM2}$. Although energy is transferred to the secondary side after setting power switch 222 into the OFF state, output voltage $V_{OUT}$ 108 remains at a value that is less than the desired output voltage value.

After setting power switch 222 into the OFF state at 672, primary switch control circuit 250 adjusts the turn-off conditions (i.e., the threshold current limit). For example, primary switch control circuit 250 increases the threshold current limit to a value of $I_{LIM3}$ in order to transfer more energy to the secondary side during future transitions of power switch 222 from the ON state to the OFF state. As illustrated at 673, primary switch control circuit 250 sets power switch 222 into the OFF state when switch current $I_{SWITCH}$ 260 reaches $I_{LIM3}$, which results in output voltage $V_{OUT}$ 108 increasing to a value that is greater than the desired output voltage value at 674. It is contemplated that the threshold current limit value $I_{LIM}$ could be varied for each ON time of power switch 222.

After a period of time, illustrated by time gap 661, power converter 100 is experiencing lighter loading conditions. During lighter loading conditions, primary side control circuit 250 may decrease the threshold current limit to a lesser value of $I_{LIM1}$. Accordingly, primary switch control circuit 250 may set power switch 222 into the OFF state when switch current $I_{SWITCH}$ 260 reaches $I_{LIM1}$ during lighter loading conditions.

FIGS. 7A-7B show example communication links through which request signal $U_{REQ}$ 236 may be transmitted. The communication links illustrated in FIGS. 7A-7B may be included in integrated circuit package 224 of the present disclosure. FIG. 7A shows an example magnetically coupled communication link included in integrated circuit package 224. Integrated circuit package 224 includes a primary conductive loop 775 and a secondary conductive loop 776 that are galvanically isolated from one another. In some examples, primary conductive loop 775 and secondary conductive loop 776 may be isolated conductors of the lead frame of integrated circuit package 224. By integrating primary and secondary conductive loops 775, 776 in the lead frame of integrated circuit package 224, the communication link between the primary and secondary sides of power converter 100 may be added to integrated circuit package 224 with less cost.

Primary conductive loop 775 may be coupled to primary switch control circuit 250. Secondary conductive loop 776 may be coupled to secondary switch control circuit 256. Although primary and secondary conductive loops 775, 776 are galvanically isolated from one another, primary and secondary conductive loops 775, 776 may be magnetically coupled such that a change in current through secondary conductive loop 776 may induce a voltage/current in primary conductive loop 775. Secondary switch control circuit 256 may transmit request signal $U_{REQ}$ 236 to primary switch control circuit 250 by inducing a change in current through secondary conductive loop 776. Primary switch control circuit 250 may detect request signal $U_{REQ}$ 236 by detecting an induced voltage and/or current in primary conductive loop 775.

FIG. 7B shows an example optically coupled communication link included in integrated circuit package 224. Integrated circuit package 224 includes an optical transmitter 777 (e.g., a light-emitting diode) and an optical receiver 778 (e.g., a phototransistor) that are galvanically isolated from one another. Optical receiver 778 may be coupled to primary switch control circuit 250. Optical transmitter 777 may be coupled to secondary switch control circuit 256. Although optical transmitter 777 and optical receiver 778 are galvanically isolated from one another, optical transmitter 777 and optical receiver 778 may form an optical communication link. For example, optical transmitter 777 may emit light that is detected by optical receiver 778. Secondary switch control circuit 256 may transmit request signal $U_{REQ}$ 236 to primary switch control circuit 250 by energizing optical transmitter 777 to emit light. Primary switch control circuit 250 may detect request signal $U_{REQ}$ 236 by detecting an induced voltage and/or current generated by optical receiver 778 in response to the light emitted by optical transmitter 777. It is contemplated that communication link technologies other than magnetically and optically coupled communication links may be used. For example, a capacitive coupling may be used as a communication link between primary controller 218 and secondary controller 220.

FIG. 8 shows an example non-isolated power converter 880 that includes a primary controller 881 and a secondary controller 882 of the present disclosure. Although primary controller 881 and secondary controller 882 are illustrated as included in a non-isolated power converter 880 having a buck converter topology, it is contemplated that primary controller 881 and secondary controller 882 may be included in non-isolated power supplies having other topologies. As described hereinafter, primary controller 881 and secondary controller 882 may operate in a similar manner as primary controller 218 and secondary controller 220 described above.

Power converter 880 includes input terminals 883-1, 883-2 (collectively "input terminals 883") and output terminals 884-1, 884-2 (collectively "output terminals 884"). Input terminals 883 are coupled to receive an input voltage $V_{IN}$ 885, which may be a rectified and filtered ac voltage. Output terminals 884 provide an output voltage $V_{OUT}$ 886 to a load (not shown).

Power converter 880 includes input capacitor 887, output capacitor 888, inductor 889, diode 890, and power switch 891. As illustrated in FIG. 8, power switch 891, diode 890, and inductor 889 are coupled to operate as a buck converter circuit. Secondary controller 882 may be coupled to receive operating power from node 892 and/or bypass capacitor 893. Secondary controller 882 may also be coupled to output terminals 884 via a feedback circuit 896 that allows secondary controller 882 to sense an output quantity of power converter 880 (e.g., output voltage $V_{OUT}$ 886).

Primary controller 881 and secondary controller 882 are galvanically isolated from one another. Although primary controller 881 and secondary controller 882 are galvanically isolated from one another, secondary controller 882 may transmit a request signal $U_{REQ}$ 894 to primary controller 881 via a communication link (e.g., a magnetically, capacitively, or optically coupled communication link). Primary controller 881 may generate switch drive signal $U_{DRIVE}$ 895 to set power switch 891 into an ON state in response to a request signal $U_{REQ}$ 894 received from secondary controller 882.

Primary controller 881 and secondary controller 882 may operate to regulate an output quantity of power converter 880 in a similar manner as described above with respect to primary controller 218 and secondary controller 220. For example, secondary controller 882 may include circuits (e.g., a secondary switch control circuit and a timing circuit) that control generation of request signals $U_{REQ}$ 894 to control how often power switch 891 is set into the ON state by primary controller 881. After each time primary controller 881 sets power switch 891 into the ON state, primary controller 881 determines when to set power switch 891 into the OFF state, e.g., in response to one or more turn-off conditions.

As described above, secondary switch control circuit 256 transmits request signal $U_{REQ}$ 236 and triggers timing circuit 258 when secondary switch control circuit 256 determines that timing circuit 258 is in the first state and output voltage $V_{OUT}$ 108 is less than the desired output voltage value. Although secondary switch control circuit 256 is described above as triggering timing circuit 258 when output voltage $V_{OUT}$ 108 is less than the desired output voltage value and timing circuit 258 is in the first state, timing circuit 258 may be triggered in a different manner in some implementations of a secondary controller. An alternative implementation of a secondary controller in which timing circuit 258 is triggered in a different manner is described hereinafter with respect to FIG. 9.

FIG. 9 shows alternate waveforms illustrating operation of primary controller 218 and secondary controller 220. Specifically, FIG. 9 shows an output voltage $V_{OUT}$ 108 waveform along with corresponding timing circuit states (T.C. STATE), switch drive signals $U_{DRIVE}$ 238, and request signals $U_{REQ}$ 236. In FIG. 9, timing circuit 258 includes an oscillator that periodically sets timing circuit 258 to a first state based on a set frequency. In this example, timing circuit 258 may be automatically set to the second state after it is briefly set to the first state in response to an oscillator internal to timing circuit 258. In this example, the state of timing circuit 258 may be determined in response to an oscillator (not shown) and may be independent of secondary switch control circuit 256.

At time zero, output voltage $V_{OUT}$ 108 is greater than the desired output voltage value (indicated by dashed line 1002). At 1004, output voltage $V_{OUT}$ 108 drops to a value that is less than the desired output voltage value. When timing circuit is set to the first state, secondary switch control circuit 256 transmits a request signal $U_{REQ}$ 1006 since timing circuit 258 is in the first state when output voltage $V_{OUT}$ 108 is less than the desired output voltage value. In response to receiving request signal $U_{REQ}$ 1006, primary switch control circuit 250 sets power switch 222 into the ON state and then the OFF state (e.g., in response to a turn-off condition), as indicated at 1008. The energy transferred to the secondary side of power converter 100 causes output voltage $V_{OUT}$ 108 to increase to a value that is greater than the desired output voltage value.

After a period of time, output voltage $V_{OUT}$ 108 again drops to a value that is less than the desired output voltage value at 1010. Secondary switch control circuit 220 may withhold transmission of request signal $U_{REQ}$ 236 at 1010 because timing circuit 258 is in the second state. Secondary switch control circuit 220 may transmit a request signal $U_{REQ}$ 1012 when timing circuit 258 transitions to the first state at 1014. In response to receiving request signal $U_{REQ}$ 1012, primary switch control circuit 250 sets power switch 222 into the ON state and then the OFF state (e.g., in response to a turn-off condition), as indicated at 1016. The energy transferred to the secondary side of power converter 100 causes output voltage $V_{OUT}$ 108 to increase. At the next time, timing circuit 258 is in the first state at 1015, output voltage 108 is still less than the desired output voltage value, secondary switch control circuit 256 then transmits another request signal $U_{REQ}$ 1013 causing primary control circuit 250 to set power switch 222 into the ON state and then the OFF state (e.g. in response to a turn-off condition), as indicated at 1017. The energy transferred to the secondary side of power converter 100 causes $V_{OUT}$ 108 to further increase to a value that is greater than the desired output voltage value at 1018.

The above description of illustrated examples of the present invention, including what is described in the Abstract, is not intended to be exhaustive or to be limiting to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, times, etc., are provided for explanation purposes and that other values may also be employed in other embodiments and examples in accordance with the teachings of the present disclosure.

What is claimed is:

1. A power converter controller comprising:
a primary controller to be coupled to a power switch of a power converter, wherein the primary controller is coupled to receive one or more request signals and transition the power switch from an OFF state to an ON state in response to each of the one or more received request signals, and wherein the primary controller is coupled to detect a turn-off condition when the power switch is in the ON state and transition the power switch from the ON state to the OFF state in response to detection of the turn-off condition; and
a secondary controller galvanically isolated from the primary controller, wherein the secondary controller is coupled to transmit the one or more request signals to the primary controller, and wherein the secondary controller is coupled to control an amount of time between the transmission of each of the request signals,
wherein the turn-off condition is a threshold current limit and the primary controller is coupled to adjust the threshold current limit in response to an amount of time the power switch is in the ON state.

2. The power converter controller of claim 1, wherein the primary controller is configured to be coupled to a primary side of the power converter, wherein the primary controller is coupled to receive the one or more request signals from a secondary side of the power converter, and wherein the secondary controller is configured to be coupled to the secondary side of the power converter.

3. The power converter controller of claim 1, wherein the secondary controller includes a timing circuit that sets a minimum amount of time between the transmission of each of the one or more request signals.

4. The power converter controller of claim 1, wherein the primary controller is coupled to maintain the power switch in the OFF state until the primary controller receives a request signal.

5. The power converter controller of claim 1, wherein the primary controller is coupled to:
detect an amount of current through the power switch while the power switch is in the ON state;
determine when the amount of current through the power switch is greater than the threshold current limit; and
transition the power switch from the ON state to the OFF state when the amount of current through the power switch is greater than the threshold current limit.

6. The power converter controller of claim 1, wherein the secondary controller is coupled to transmit the request signals via a communication link, wherein the primary controller is coupled to receive the request signals via the communication link, and wherein the communication link includes at least one of an optical communication link, a capacitive communication link, and a magnetic communication link.

7. The power converter controller of claim 3, wherein the minimum amount of time between the transmission of each of the one or more request signals sets a minimum amount of time between two consecutive transitions of the power switch from the OFF state to the ON state.

8. The power converter controller of claim 3, wherein the timing circuit is coupled to operate in a first state until triggered to operate in a second state, wherein the timing circuit is in the second state for a holding period and transitions back to the first state at an end of the holding period, and wherein the holding period sets the minimum amount of time between the transmission of two consecutive request signals.

9. The power converter controller of claim 8, wherein the secondary controller includes a secondary switch control circuit coupled to sense an output quantity of the power converter and transmit one of the request signals to the primary controller when the a sensed output quantity is less than a desired output quantity and the timing circuit is in the first state, wherein the secondary switch control circuit triggers the timing circuit in response to transmitting the request signal.

10. The power converter controller of claim 8, wherein the secondary controller includes a secondary switch control circuit coupled to sense an output quantity of the power converter and transmit one of the request signals to the primary controller when the sensed output quantity is less than a desired output quantity and the timing circuit is in the first state.

11. A power converter controller comprising:
a secondary controller comprising:
   a timing circuit coupled to operate in a first state until triggered to operate in a second state, wherein the timing circuit is in the second state for a holding period and transitions back to the first state at an end of the holding period; and
   a secondary switch control circuit coupled to sense an output quantity of a power converter and transmit a request signal when the a sensed output quantity is less than a desired output quantity and the timing circuit is in the first state, wherein the secondary switch control circuit triggers the timing circuit in response to transmitting the request signal; and
a primary controller to be coupled to a power switch of the power converter and galvanically isolated from the secondary controller, wherein the primary controller is coupled to receive the transmitted request signal and set the power switch into an ON state in response to the request signal, and wherein the primary controller is coupled to detect a turn-off condition and transition the power switch from the ON state to an OFF state in response to detection of the turn-off condition,
wherein the primary controller is configured to maintain the power switch in the OFF state for a threshold period of time after transitioning the power switch to the OFF state, and wherein the primary controller is configured to refrain from setting the power switch into the ON state in response to a subsequent request signal received during the threshold period of time.

12. The power converter controller of claim 11, wherein the power converter is a non-isolated power converter.

13. The power converter controller of claim 11, wherein the power converter is an isolated power converter, wherein the secondary controller is configured to be coupled to a secondary side of the power converter, and wherein the primary controller is configured to be coupled to a primary side of the power converter.

14. The power converter controller of claim 11, wherein after transitioning the power switch to the OFF state, the primary controller is coupled to maintain the power switch in the OFF state until receiving another request signal.

15. The power converter controller of claim 11, wherein the holding period is selected to be a value that is greater than the amount of time the primary controller maintains the power switch in the ON state.

16. The power converter controller of claim 11, wherein the request signal is a pulse, and wherein the primary controller is coupled to receive the pulse and set the power switch into the ON state in response to the pulse.

17. The power converter controller of claim 11, wherein the turn-off condition includes a threshold current limit, wherein the primary controller is coupled to sense an amount of current through the power switch when the power switch is in the ON state, and wherein the primary controller is coupled to transition the power switch from the ON state to the OFF state when the amount of current through the power switch is greater than the threshold current limit.

18. The power converter controller of claim 11, wherein the turn-off condition includes a threshold amount of time, and wherein the primary controller is coupled to transition the power switch from the ON state to the OFF state when the power switch has been in the ON state for the threshold amount of time.

19. The power converter controller of claim 11, wherein the primary controller is coupled to adjust the turn-off condition in response to at least one of an amount of time the power switch is in the ON state and a number of request signals received by the primary controller during a period of time.

20. The power converter controller of claim 11, wherein the secondary controller is coupled to transmit the request signal via a communication link, wherein the primary controller is coupled to receive the request signal via the communication link, and wherein the communication link includes at least one of an optical communication link, a capacitive communication link, and a magnetic communication link.

21. A power converter comprising:
an energy transfer element comprising a primary winding on a primary side of the power converter and a secondary winding on a secondary side of the power converter;
a power switch coupled to the primary winding;
a primary controller coupled to the power switch, wherein the primary controller is coupled to receive one or more request signals from the secondary side and transition the power switch from an OFF state to an ON state in response to each of the one or more received request signals, and wherein the primary controller is coupled to detect a turn-off condition when the power switch is in the ON state and transition the power switch from the ON state to the OFF state in response to detection of the turn-off condition; and
a secondary controller coupled to the secondary side and galvanically isolated from the primary controller, wherein the secondary controller is coupled to transmit the one or more request signals to the primary controller, and wherein the secondary controller is coupled to control an amount of time between the transmission of each of the one or more request signals,
wherein the turn-off condition is a threshold current limit and the primary controller is coupled to adjust the threshold current limit in response to an amount of time the power switch is in the ON state.

22. The power converter of claim 21, wherein the secondary controller includes a timing circuit that sets a minimum amount of time between the transmission of each of the request signals.

23. The power converter of claim 21, further comprising a communication link, wherein the secondary controller is coupled to transmit the one or more request signals via the communication link, wherein the primary controller is coupled to receive the one or more request signals via the communication link, and wherein the communication link includes at least one of an optical communication link, a capacitive communication link, and a magnetic communication link.

24. The power converter of claim 22, wherein the minimum amount of time is set to a value that is greater than a sum of an expected ON time of the power switch and an expected amount of time during which energy is delivered to the secondary side of the power converter.

25. The power converter of claim 22, wherein the timing circuit is coupled to operate in a first state until triggered to operate in a second state, wherein the timing circuit is in the second state for a holding period and transitions back to the first state at an end of the holding period, and wherein the holding period sets a minimum amount of time between the transmission of two consecutive request signals.

26. The power converter of claim 25, wherein the secondary controller includes a secondary switch control circuit coupled to sense an output quantity of the power converter and transmit one of the request signals to the primary controller when the sensed output quantity is less than a desired output quantity and the timing circuit is in the first state, and wherein the secondary switch control circuit triggers the timing circuit in response to transmitting the one or more request signal.

27. The power converter of claim 25, wherein the secondary controller includes a trigger circuit coupled to trigger the timing circuit at a frequency defined by the trigger circuit.

28. The power converter of claim 27, wherein the secondary controller includes a secondary switch control circuit coupled to sense an output quantity of the power converter and transmit one of the request signals to the primary controller when the sensed output quantity is less than a desired output quantity and the timing circuit is in the first state.

* * * * *